(12) United States Patent
Sato

(10) Patent No.: US 10,547,263 B2
(45) Date of Patent: Jan. 28, 2020

(54) MOTOR DRIVING APPARATUS, SHEET CONVEYANCE APPARATUS, DOCUMENT FEEDING APPARATUS, DOCUMENT READING APPARATUS AND IMAGE FORMING APPARATUS

(71) Applicant: CANON KABUSHIKI KAISHA, Tokyo (JP)

(72) Inventor: Hiroki Sato, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 77 days.

(21) Appl. No.: 15/463,182

(22) Filed: Mar. 20, 2017

(65) Prior Publication Data

US 2017/0288589 A1 Oct. 5, 2017

(30) Foreign Application Priority Data

Mar. 30, 2016 (JP) .................. 2016-069275

(51) Int. Cl.
*H02P 21/22* (2016.01)
*H02P 27/08* (2006.01)
(Continued)

(52) U.S. Cl.
CPC ............... *H02P 21/22* (2016.02); *B65H 1/04* (2013.01); *B65H 3/06* (2013.01); *B65H 5/06* (2013.01); *H02P 6/085* (2013.01); *H02P 27/08* (2013.01); *H04N 1/0062* (2013.01); *H04N 1/00602* (2013.01); *H04N 1/00631* (2013.01); *H04N 1/00899* (2013.01); *B65H 2801/06* (2013.01); *H04N 2201/0094* (2013.01)

(58) Field of Classification Search
CPC .......... H02P 6/085; H02P 7/04; H02P 27/085; H02P 2209/09; H02P 7/29; H02P 27/08; H02P 27/06; H02P 27/04
See application file for complete search history.

(56) References Cited

U.S. PATENT DOCUMENTS 5,574,344 A 11/1996 Matsuoka et al.
6,997,684 B2 * 2/2006 Hahn ...................... H02P 6/085
318/434
(Continued)

FOREIGN PATENT DOCUMENTS

JP 08-099645 A 4/1996

OTHER PUBLICATIONS

Hiroki Sato, U.S. Appl. No. 15/278,217, filed Sep. 28, 2016, Art Unit 2837.

*Primary Examiner* — Bickey Dhakal
(74) *Attorney, Agent, or Firm* — Venable LLP

(57) ABSTRACT

A motor control unit controls a driving current that flows through a coil of a motor to be driven, by controlling a PWM signal supplied to an H bridge circuit constituted by FETs. A current value generation unit detects a driving current based on a voltage that occurs across a current detection resistor, and corrects a detection value by using a first or second correction value. The current value generation unit, if the driving current is detected in the H period of the PWM signal, corrects the detection value by using the first correction value, and if the driving current is detected in the L period of the PWM signal, corrects the detection value by using the second correction value that has a polarity different from a polarity of the first correction value.

15 Claims, 14 Drawing Sheets

(51) Int. Cl.
*B65H 1/04* (2006.01)
*B65H 3/06* (2006.01)
*B65H 5/06* (2006.01)
*H02P 6/08* (2016.01)
*H04N 1/00* (2006.01)

(56) References Cited

U.S. PATENT DOCUMENTS

| | | | | |
|---|---|---|---|---|
| 8,471,510 | B2* | 6/2013 | Pollock | H02P 6/10 |
| | | | | 318/400.34 |
| 8,816,614 | B2* | 8/2014 | Barth | H02P 8/02 |
| | | | | 318/278 |
| 9,059,657 | B2* | 6/2015 | Maekawa | H02P 27/085 |
| 9,178,452 | B2* | 11/2015 | Soh | H02P 6/10 |
| 9,555,828 | B2* | 1/2017 | Tashima | B62D 5/0406 |
| 2012/0206945 | A1* | 8/2012 | Brogan | H02M 1/12 |
| | | | | 363/40 |
| 2016/0308483 | A1* | 10/2016 | Ogoshi | H02P 29/0241 |
| 2017/0373622 | A1* | 12/2017 | Hijikata | H02P 8/22 |
| 2019/0013761 | A1* | 1/2019 | Seo | H02P 27/08 |

\* cited by examiner

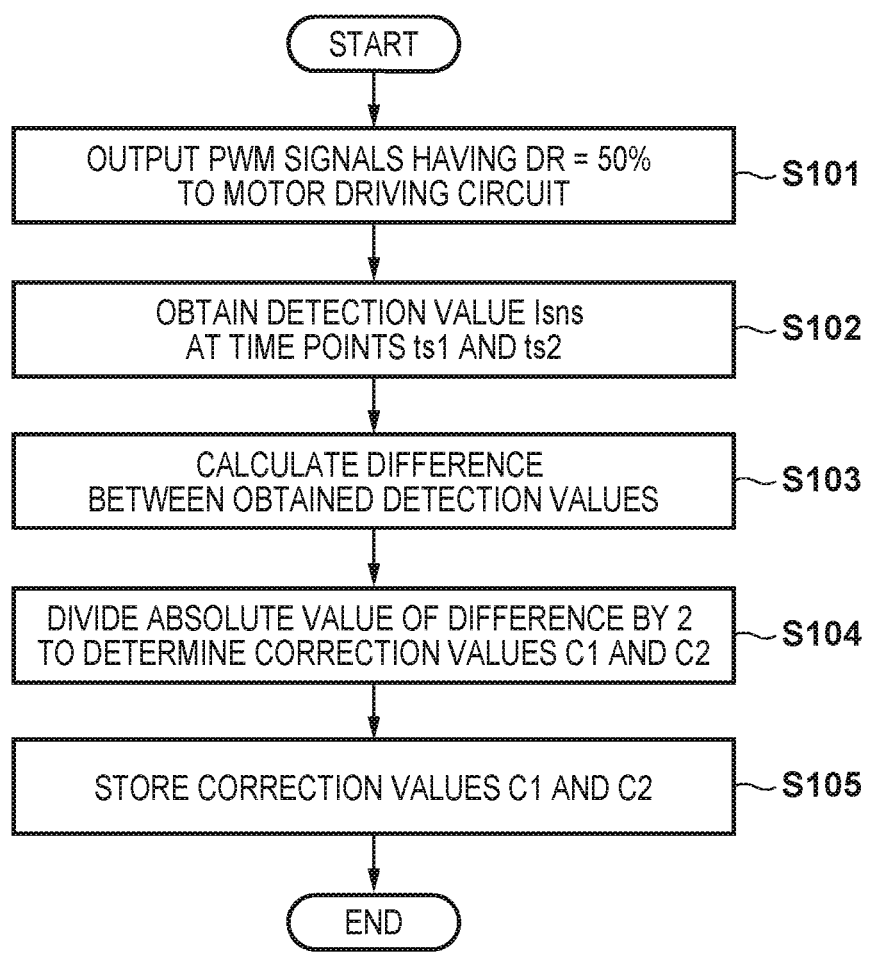
F I G. 10

F I G. 11
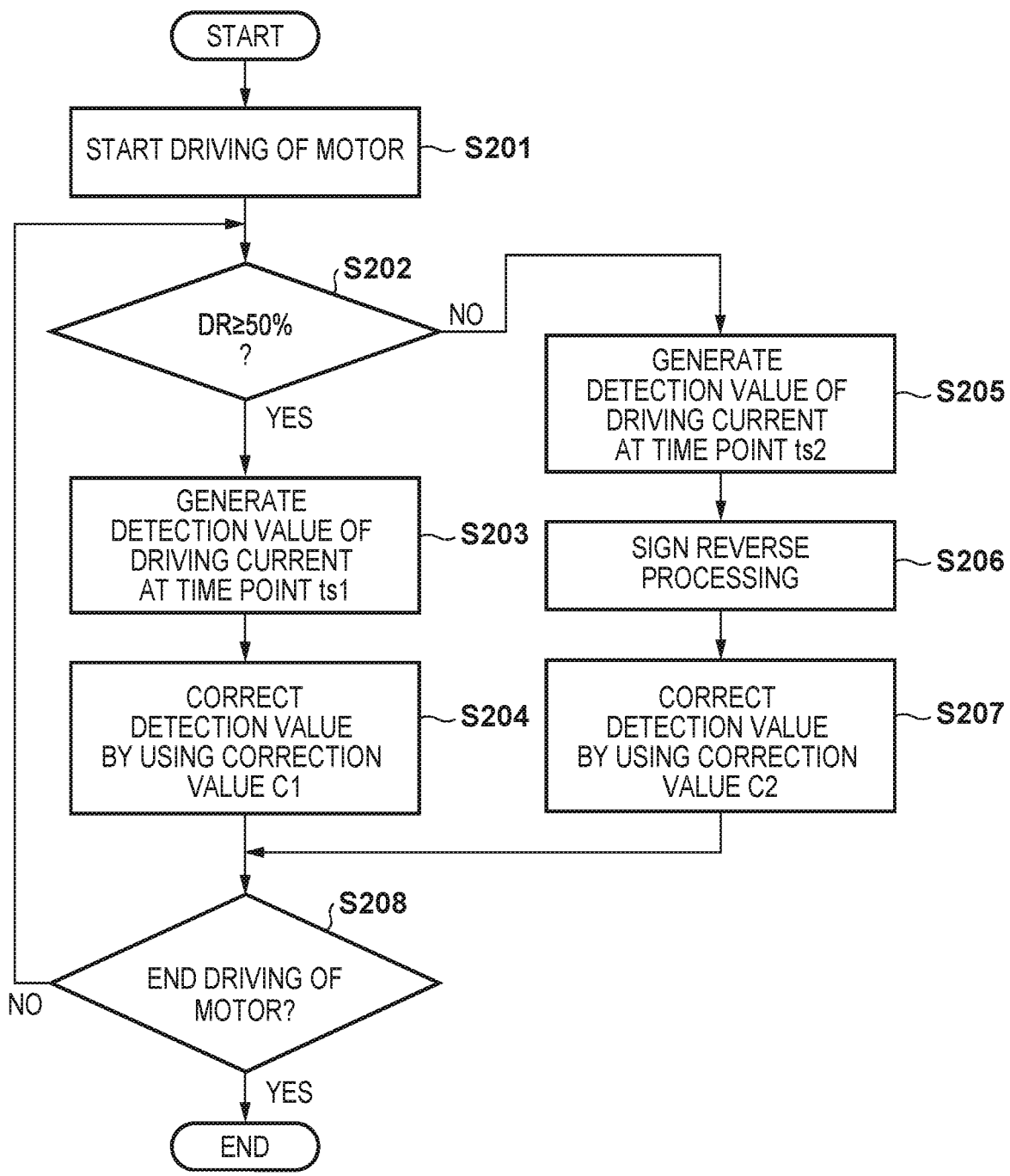

MOTOR DRIVING APPARATUS, SHEET CONVEYANCE APPARATUS, DOCUMENT FEEDING APPARATUS, DOCUMENT READING APPARATUS AND IMAGE FORMING APPARATUS

BACKGROUND OF THE INVENTION

Field of the Invention

The present invention relates to a motor driving apparatus, a sheet conveyance apparatus, a document feeding apparatus, a document reading apparatus and an image forming apparatus.

Description of the Related Art

In electrophotographic image forming apparatuses such as copiers and printers, motors such as stepping motors are widely used as a driving source of a conveyance system that conveys recording materials such as sheets of paper on which images are to be formed. In a case where a driving circuit such as an H bridge circuit that is constituted by a plurality of switching elements (FETs) is used to drive such a motor, the motor is driven by the FETs being controlled by PWM signals, and a driving current being supplied to the motor. In such a case, a driving current that flows through the winding of the motor is detected, and a PWM signal is generated based on the result of detection, and thus driving control, by which the value of the driving current that is to be supplied to the motor is controlled so as to be a target value, can be realized.

In a configuration in which an H bridge circuit is used as a driving circuit for a motor, the driving current that flows through the winding of the motor can be detected based on, for example, the current that flows through a current detection resistor that is arranged on the ground side of the H bridge circuit. U.S. Pat. No. 5,574,344 discusses a configuration in which the driving current that flows through the winding of the motor is detected by using a resistor that is arranged on the ground side of the H bridge circuit, and in which the driving current that flows through the winding of the motor is detected by reversing the polarity (sign), which is positive or negative, of the voltage across the two ends of the resistor in synchronization with a PWM signal.

In the case of driving a motor by using the above-described driving circuit or the like, there is the possibility of the result of detection of the driving current being distorted due to the transient response properties of the driving current that flows through the winding (coil) of the motor, in response to the PWM signal supplied to the driving circuit. Specifically, the current value that is detected varies depending on whether the driving current is detected during a period in which the PWM signal is at an H level or during a period in which the PWM signal is at an L level. As a result, the current waveform that indicates the result of detection of the driving current is distorted, and there is the possibility of a failure occurring in motor driving control that is performed based on the result of detection.

SUMMARY OF THE INVENTION

The present invention has been made in view of the above-described problems. The present invention provides a technology that is applicable to a motor driving apparatus provided with a driving circuit that supplies a driving current to a motor based on a PWM signal, to reduce distortion that occurs in the result of detection of the driving current flowing through the winding of the motor.

According to one aspect of the present invention, there is provided a motor driving apparatus comprising: a driving circuit that includes a plurality of switching elements constituting an H bridge circuit, and to which a winding of a motor is connected; a detector configured to detect a driving current that flows through the winding of the motor; a pulse generator configured to generate a PWM signal that controls ON and OFF operations of the plurality of switching elements and includes a pulse at a first level and a pulse at a second level that is different from the first level; and a corrector configured to sample a current value of the driving current detected by the detector, and correct the current value, wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, wherein the corrector corrects the current value sampled in the first period based on a first correction value that reduces the current value, and corrects the current value sampled in the second period based on a second correction value that increases the current value, wherein the pulse generator generates the PWM signal based on the current value corrected by the corrector.

According to another aspect of the present invention, there is provided a sheet conveyance apparatus comprising: a conveyance roller configured to convey a sheet; and a motor configured to drive the conveyance roller, a motor driving apparatus that includes a driving circuit that includes a plurality of switching elements constituting an H bridge circuit, and to which a winding of the motor, a detector configured to detect a driving current that flows through the winding of the motor, a pulse generator configured to generate a PWM signal that controls ON and OFF operations of the plurality of switching elements and includes a pulse at a first level and a pulse at a second level that is different from the first level, and a corrector configured to sample a current value of the driving current detected by the detector, and correct the current value, wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, wherein the corrector corrects the current value sampled in the first period, based on a first correction value that reduces the current value, and corrects the current value sampled in the second period, based on a second correction value that increases the current value, wherein the pulse generator generates the PWM signal based on the current value corrected by the corrector, wherein the motor driving apparatus controls driving of the motor.

According to still another aspect of the present invention, there is provided a document feeding apparatus comprising: a document stacking unit on which a document is stacked, a feed roller configured to feed a document stacked the document stacking unit; and a motor configured to drive the feed roller, a motor driving apparatus that includes a driving circuit that includes a plurality of switching elements constituting an H bridge circuit, and to which a winding of the motor is connected, a detector configured to detect a driving current that flows through the winding of the motor, a pulse generator configured to generate a PWM signal that controls ON and OFF operations of the plurality of switching elements and includes a pulse at a first level and a pulse at a second level that is different from the first level, and a corrector configured to sample a current value of the driving current detected by the detector, and correct the current value, wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, wherein the corrector corrects the current value sampled in the first period, based on a first correction value that reduces the current value, and corrects the current value sampled in the second period, based on a second correction value that increases the current value, wherein the pulse generator generates the PWM signal based on the current value corrected by the corrector, wherein the motor driving apparatus controls driving of the motor.

According to yet another aspect of the present invention, there is provided a document reading apparatus comprising: a document stacking unit on which a document is stacked; a feed roller configured to feed a document stacked the document stacking unit; a motor configured to drive the feed roller; a reading unit configured to read the document that is fed by the feed roller; a motor driving apparatus that includes a driving circuit that includes a plurality of switching elements constituting an H bridge circuit, and to which a winding of the motor is connected, a detector configured to detect a driving current that flows through the winding of the motor, a pulse generator configured to generate a PWM signal that controls ON and OFF operations of the plurality of switching elements and includes a pulse at a first level and a pulse at a second level that is different from the first level, and a corrector configured to sample a current value of the driving current detected by the detector, and correct the current value, wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, wherein the corrector corrects the current value sampled in the first period, based on a first correction value that reduces the current value, and corrects the current value sampled in the second period, based on a second correction value that increases the current value, wherein the pulse generator generates the PWM signal based on the current value corrected by the corrector, wherein the motor driving apparatus controls driving of the motor.

According to still yet another aspect of the present invention, there is provided an image forming apparatus comprising: an image forming unit configured to form an image on a recording medium; a conveyance roller configured to convey the recording medium; a motor configured to drive the conveyance roller; a motor driving apparatus that includes a driving circuit that includes a plurality of switching elements constituting an H bridge circuit, and to which a winding of the motor is connected, a detector configured to detect a driving current that flows through the winding of the motor, a pulse generator configured to generate a PWM signal that controls ON and OFF operations of the plurality of switching elements and includes a pulse at a first level and a pulse at a second level that is different from the first level, and a corrector configured to sample a current value of the driving current detected by the detector, and correct the current value, wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, wherein the corrector corrects the current value sampled in the first period, based on a first correction value that reduces the current value, and corrects the current value sampled in the second period, based on a second correction value that increases the current value, wherein the pulse generator generates the PWM signal based on the current value corrected by the corrector, wherein the motor driving apparatus controls driving of the motor, wherein the image forming unit forms an image on the recording medium that is conveyed by the conveyance roller.

With the present invention, when applied to a motor driving apparatus provided with a driving circuit that supplies a driving current to a motor based on a PWM signal, it is possible to reduce distortion that occurs in the result of detection of the driving current flowing through the winding of the motor.

Further features of the present invention will become apparent from the following description of exemplary embodiments (with reference to the attached drawings).

BRIEF DESCRIPTION OF THE DRAWINGS

FIG. 10 is a flowchart showing a procedure for obtaining a corrected value.

FIG. 11 is a flowchart showing the procedure of motor driving control.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Image Forming Apparatus 100>

Figure 16:
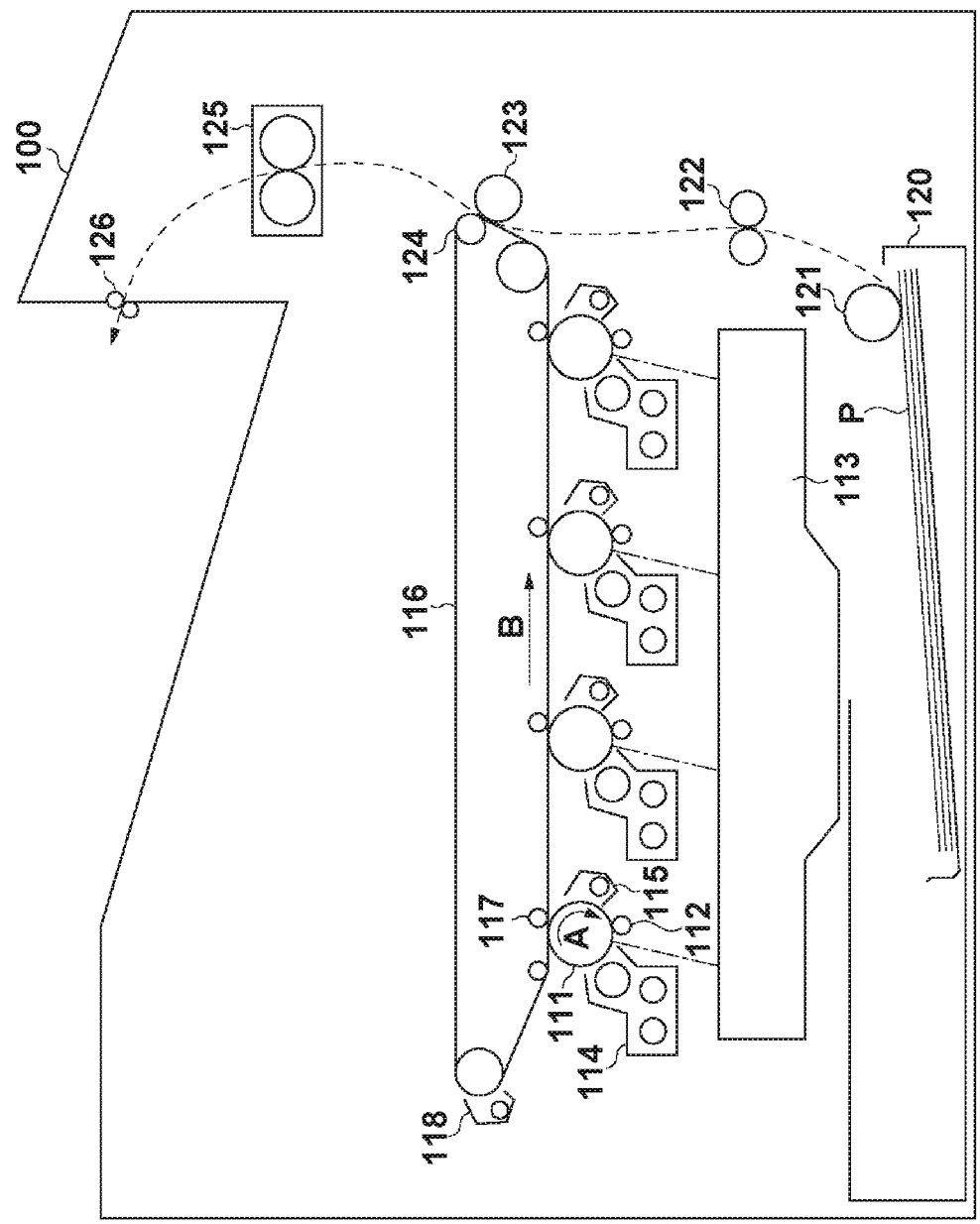
FIG. 16 is a cross-sectional view showing an example of a configuration of an image forming apparatus 100.

First, with reference to FIG. 16, a description will be given of an example of a configuration of an image forming apparatus that serves as a sheet conveyance apparatus to which a motor driving apparatuses that will be described in the following embodiments 1 to 3 is installed. FIG. 16 is a cross-sectional view showing an example of an overall configuration of an image forming apparatus 100. Although the image forming apparatus 100 may be an image forming apparatus that forms monochrome images, in the following description, it is assumed that the image forming apparatus 100 is an image forming apparatus that forms multicolor images by using toner (developer) of a plurality of colors. The image forming apparatus 100 may be any of: a printing apparatus; a printer; a copier; a multifunctional peripheral (MFP); and a facsimile apparatus. The image forming apparatus 100 is provided with four image forming stations that form toner images by using toner of four colors, namely yellow (Y), magenta (M), cyan (C), and black (K). In FIG. 16, only the components of the Y color station are given reference numerals. However, the same components may be employed in all of the four stations. Note that each station is an example of an image forming unit that forms images on image carriers such as a photosensitive drum 111 and an intermediate transfer belt 116 by using toner.

A primary charging unit 112 uniformly charges the photosensitive drum 111 that rotates. An exposure unit 113 outputs a laser beam (an optical beam) that has been modulated based on an image signal, and scans the surface of the photosensitive drum 111 with the laser beam. Thus, an electrostatic latent image is formed on the photosensitive drum 111. A developing unit 114 develops the electrostatic latent image by using toner, to form a toner image on the photosensitive drum 111. A primary transfer roller 117 transfers the toner image on the photosensitive drum 111 onto the intermediate transfer belt 116. The intermediate transfer belt 116 rotates in the direction indicated by an arrow B. The toner image on the intermediate transfer belt 116 is conveyed to a secondary transfer unit that is constituted by the intermediate transfer belt 116 and a secondary transfer roller 123. In the meantime, toner images of the respective colors, which have been formed on the photosensitive drums 111 of the stations, are sequentially overlaid and transferred onto the intermediate transfer belt 116, and thus a multicolor toner image is formed on the intermediate transfer belt 116.

A sheet P in a paper feed cassette (a paper feeding unit) 120 is fed to a sheet conveyance path, by a paper feed roller (a pickup roller) 121. The sheet P may be referred to as a recording sheet, a recording material, a recording medium, a sheet of paper, a transfer material, a sheet of transfer paper, or the like. The sheet P fed to the sheet conveyance path is conveyed by a conveyance roller 122 to a secondary transfer unit. In the secondary transfer unit, the toner image that has been conveyed by the intermediate transfer belt 116 is transferred to the sheet P. A fixing unit 125 applies heat and pressure to the toner image to fix the toner image onto the sheet P. Thereafter, the sheet P onto which the toner image has been fixed is discharged to a discharge tray (a discharging unit) by a discharge roller 126. Note that toner that remains on the surface of the photosensitive drum 111 and the surface of the intermediate transfer belt 116 is removed (collected) by a drum cleaner 115 and a belt cleaner 118, respectively.

As described above, the image forming apparatus 100 includes the paper feed roller 121, the conveyance roller 122, the discharge roller 126, and so on as rollers for conveying a recording material such as a sheet of paper on which an image is to be formed. Motors that serve as driving sources that drive the rollers are driven by motor driving apparatuses that will be described in the following embodiments. Note that the image forming apparatus 100 has the motor driving apparatus that will be described in the following description, for each motor. If the image forming apparatus 100 is a multifunction peripheral (MFP) or the like that includes an automatic document feeder (ADF) that feeds documents to an image reading apparatus, the motor driving apparatus that will be described in the following description may be used as a motor driving apparatus which controls a motor that drives a document conveyance roller that is provided in the ADF.

First Embodiment

Figure 1:
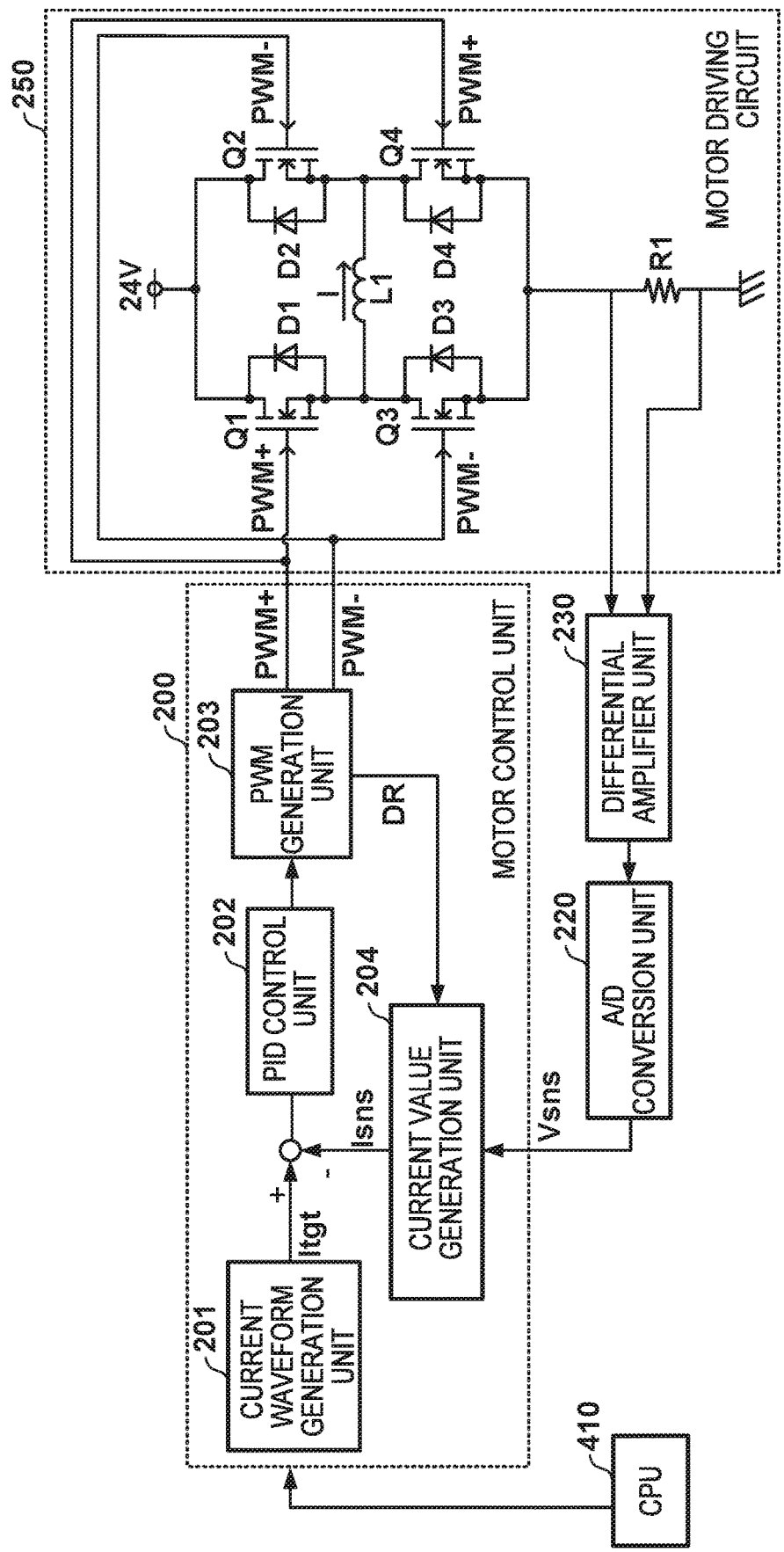
FIG. 1 is a diagram showing an example of an overall configuration of a motor driving apparatus.

FIG. 1 is a diagram showing an example of an overall configuration of a motor driving apparatus according to the first embodiment. The motor driving apparatus is constituted by a motor driving circuit 250 and a motor control unit 200. The motor driving circuit 250 supplies a driving current (a phase current) I to a winding (coil) L1 of a motor that is to be driven, thereby driving the motor. The motor control unit 200 performs motor driving control by controlling a PWM signal that is to be supplied to the motor driving circuit 250. The motor driving control by the motor control unit 200 is realized by a CPU 410 performing program that is stored in a storage device such as a ROM. Alternatively, the motor driving control by the motor control unit 200 may be realized by one or more circuits (e.g. ASICs) that realize the functions of the blocks shown in FIG. 1.

In the present embodiment, a description will be given of a case where the motor that is to be driven by the motor driving apparatus is a two-phase stepping motor. In this case, the motor driving apparatus shown in FIG. 1 is provided for each of: an A phase (first phase) winding (a coil L1) of the stepping motor; and a B phase (second phase) winding (a coil L2) of the stepping motor.

<Motor Driving Circuit 250>

As shown in FIG. 1, the motor driving circuit 250 is constituted by FETs Q1 to Q4 that serve as switching elements, the coil L1 of the motor that is to be driven, and a current detection resistor (current detection element) R1. The FETs Q1 to Q4 constitute an H bridge circuit that drives the motor that is to be driven. The coil L1 is connected between the connection point of the FETs Q1 and Q3 and the connection point of the FET Q2 and Q4. Furthermore, the drain terminals of the FETs Q1 and Q2 are connected to a 24V power supply terminal, and the source terminals of the FETs Q3 and Q4 are connected to one end of the current detection resistor R1. Furthermore, the other end of the current detection resistor R1 is connected to a ground (GND). In other words, the current detection resistor R1 is grounded. The motor driving circuit 250 drives the motor by supplying the driving current I to the coil L1 in response to the switching of the FETs (the ON/OFF operations of the gates). Note that although N channel FETs are used as the FETs Q1 to Q4 in the present embodiment, P channel FETs may be used.

In the motor driving circuit 250, the switching of each of the FETs Q1 to Q4 is performed based on the PWM signals (PWM+ and PWM−) that are supplied from the motor control unit 200. The operations of the FETs Q1 to Q4 are brought into an ON state when the PWM signal is at the high level (H level), and into an OFF state when the PWM signal is at the low level (L level). The FETs Q1 and Q4 are driven by a PWM signal (PWM+). The FETs Q2 and Q3 are driven by a PWM signal (PWM−) that is in an antiphase relationship with PWM+. Therefore, when the FETs Q1 and Q4 are in the ON state, the FETs Q2 and Q3 are in the OFF state, and when the FETs Q1 and Q4 are in the OFF state, the FETs Q2 and Q3 are in the ON state.

As described below, it is possible to change the driving current I that flows through the coil L1 of the motor by switching between the ON state and the OFF state of the FETs Q1 to Q4. The motor control unit 200 controls the driving current I that flows through the coil L1 of the motor by controlling the PWM signals (PWM+ and PWM−) that is to be supplied to the motor driving circuit 250. Note that the driving current I that flows through the coil L2 of the motor is controlled in the same manner. The driving currents I that flow through the coil L1 and the L2 of a motor corresponding to the respective phases are independently controlled, and thus the driving control is performed on the motor.

Figure 2:
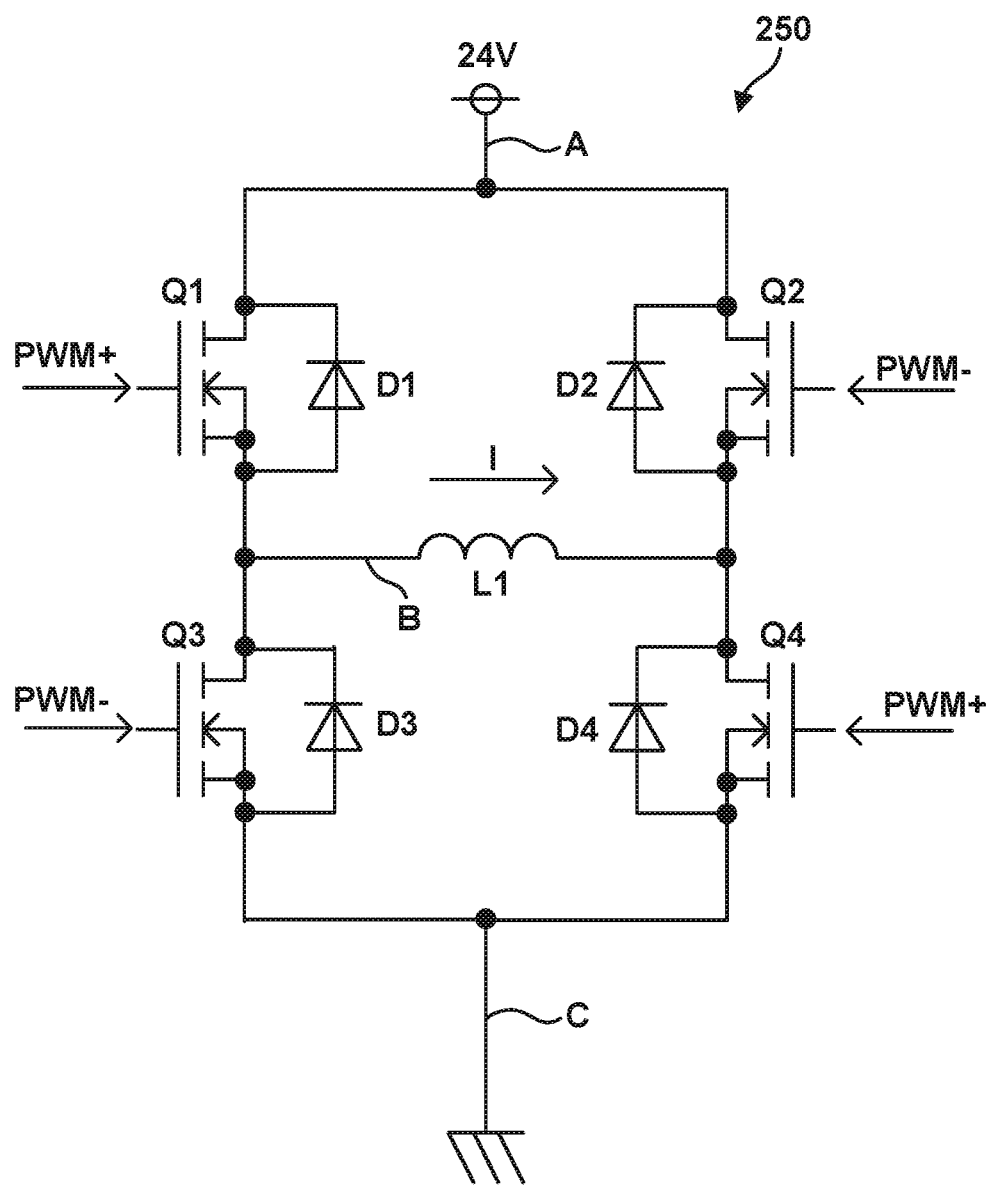
FIG. 2 is a diagram showing a configuration of a motor driving circuit 250 from which a current detection resistor R1 is excluded.
Figure 3A:
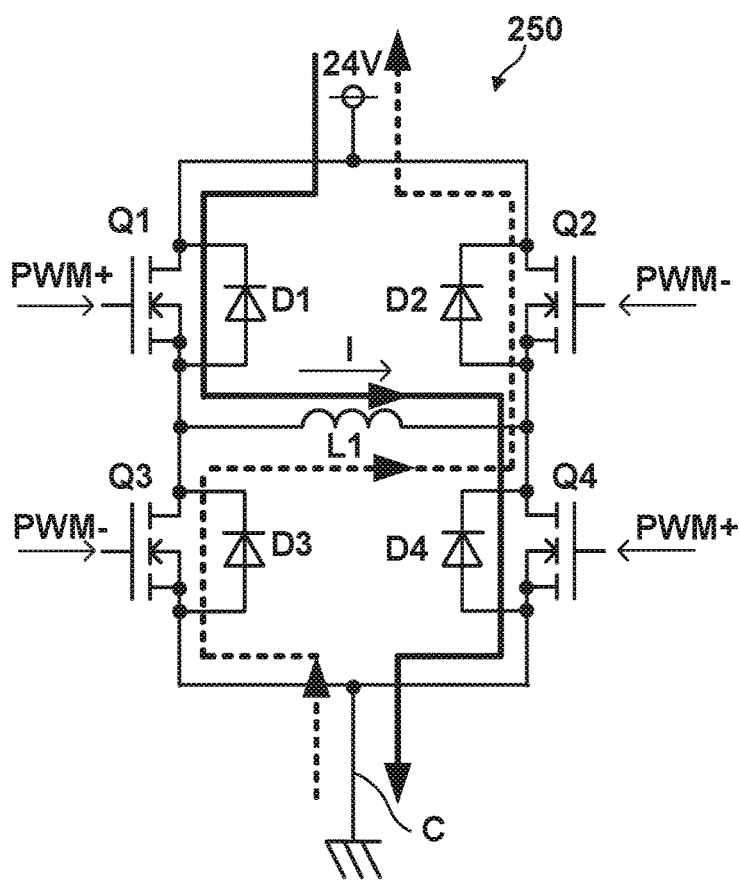
FIGS. 3A and 3B are diagrams showing paths of a current that flows through the motor driving circuit 250.
Figure 3B:
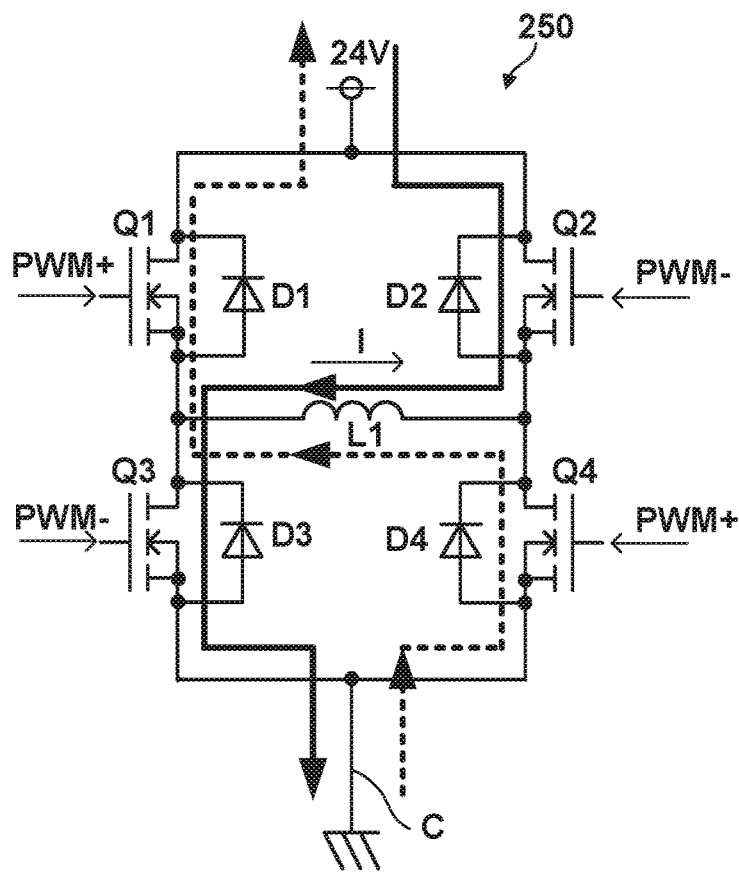
Figure 4:
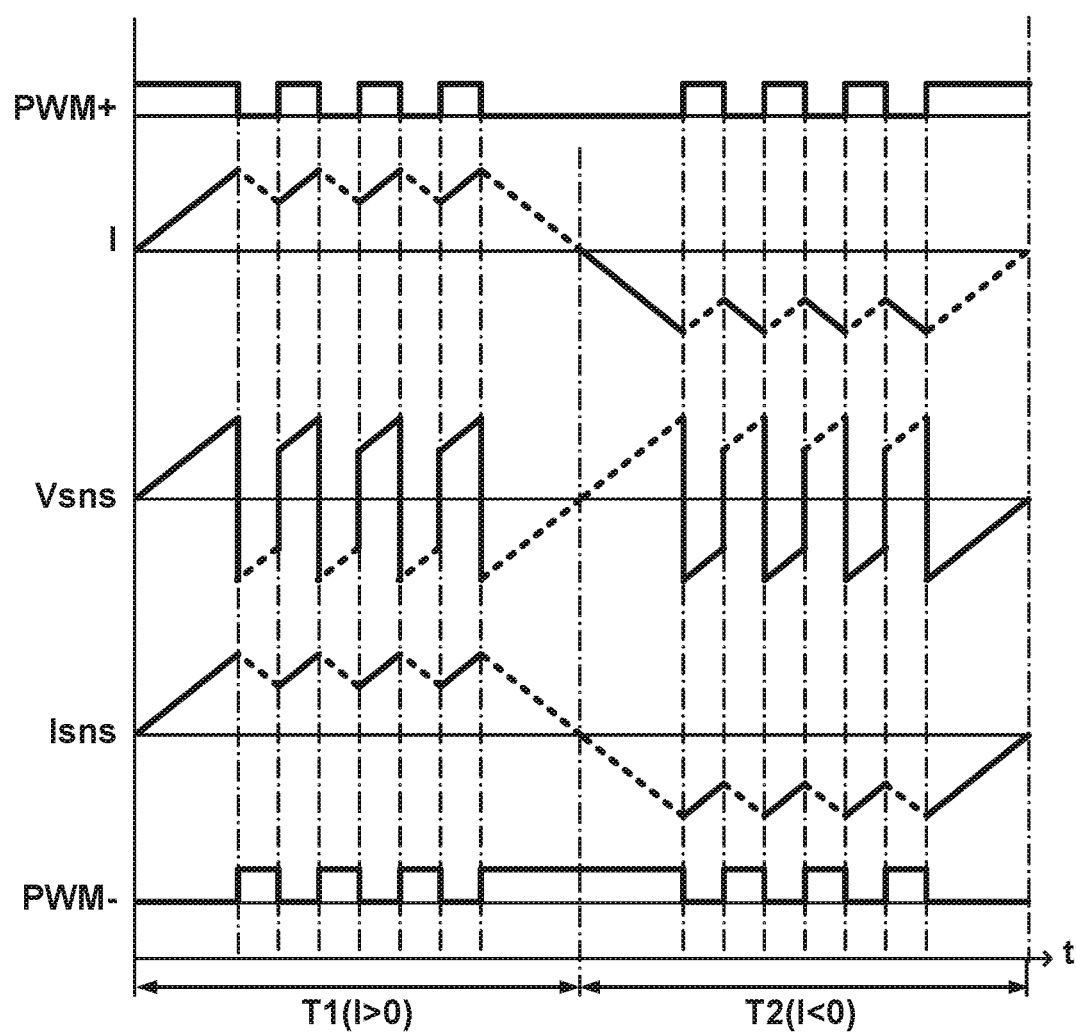
FIG. 4 is a time chart showing a relationship between a PWM signal, a driving current I, a voltage value Vsns, and a detection value Isns of the driving current I.

Here, operations of the motor driving circuit 250 will be described with reference to FIGS. 2 to 4. FIG. 2 shows a configuration of the motor driving circuit 250 shown in FIG. 1 from which the current detection resistor R1 is excluded. The source terminals of the FETs Q3 and Q4 are connected to GND. FIGS. 3A and 3B are diagrams showing paths of a current that flows through the motor driving circuit 250. FIG. 4 is a time chart showing a relationship between: the PWM signals (PWM+ and PWM−) that are supplied to the motor driving circuit 250; the driving current I; a voltage value Vsns that corresponds to the voltage that is generated in the current detection resistor R1 (FIG. 1); and the detection value Isns of the driving current I. In FIG. 4, a period T1 is a period during which the driving current I is positive (I>0), i.e., a period during which the driving current I flows in the direction indicated by the arrow shown in FIG. 2. A period T2 is a period during which the driving current I is negative (I<0), i.e., a period during which the driving current I flows in the direction that is opposite the direction indicated by the arrow shown in FIG. 2. As shown in FIG. 4, the PWM signals (PWM+ and PWM−) each change between the H level (the ON state) and the L level (the OFF state), and the driving current I changes in response to changes in the PWM signals.

During the period T1, when PWM+ is at the H level (PWM− is at the L level), current flows through the path that is indicated by the solid line in FIG. 3A (the power supply→Q1→L1→Q4→GND). In this case, the driving current I changes in the manner indicated by the solid lines shown in FIG. 4.

Thereafter, upon PWM+ changing to the L level (PWM− changing to the H level), an induced electromotive force (counter-electromotive force) is generated in the coil L1 of the motor, in the direction that prevents a sudden change in the driving current I. This induced electromotive force predominates over the power supply (24V) that drives the motor, and consequently, current flows through the path that is indicated by the dotted line shown in FIG. 3A (GND→Q3→L1→Q2→the power supply). In this case, the driving current I changes in the manner indicated by the dotted lines shown in FIG. 4.

In contrast, during the period T2, if PWM+ is at the L level (PWM− is at the H level), current flows through the path that is indicated by the solid line in FIG. 3B (the power supply→Q2→L1→Q3→GND). In this case, the driving current I changes in the manner indicated by the solid lines shown in FIG. 4.

Thereafter, upon PWM+ changing to the H level (PWM− changing to the L level), an induced electromotive force is generated in the coil L1 of the motor, in the direction that prevents a sudden change in the driving current I. This induced electromotive force predominates over the power supply (24V) that drives the motor, and consequently, current flows through the path that is indicated by the dotted line shown in FIG. 3B (GND→Q4→L1→Q1→the power supply). In this case, the driving current I changes in the manner indicated by the dotted lines shown in FIG. 4.

As described above, motor driving control is performed by controlling the driving current I that flows through the coil L1 (and the coil L2). The motor control unit 200 controls the PWM signals (PWM+ and PWM−) for driving the FETs Q1 to Q4, and the driving current I is thereby controlled so as to be a desired value. In order to realize such control, it is required that, in the motor driving circuit 250, the driving current I that actually flows through the coil L1 is detected, and a PWM signal by which the driving current I is controlled so as to be a desired value is generated based on the result of detection.

The driving current I is detected by, for example, using elements for current detection that are disposed at a point A, a point B, or a point C shown in FIG. 2. Note that the point A is a point on a conducting wire that connects the connection point between the drain terminal of the FET Q1 and the drain terminal of the FET Q2 to the power supply. The point C is a point on the conducting wire that connects the connection point between the source terminal of the FET Q3 and the source terminal of the FET Q4 to the ground. In the case where the driving current I is detected at the point A or B, an element that supports the voltage (24V) of the power supply (i.e. an element that supports high voltage), or a non-contact element such as a hole element, is required. In contrast, in the case where the driving current I is detected at the point C, the voltage across the detection point is low, and it is possible to detect the current by using a relatively cheap element (e.g. a current detection resistor and a differential amplifier or the like that amplifies the voltage across two ends of the current detection resistor).

Therefore, in the present embodiment, as shown in FIG. 1, the current detection resistor R1 is disposed at the point C, and the driving current I is detected based on the voltage that is generated in the current detection resistor R1 (i.e. the voltage across the two ends of the current detection resistor R1). Specifically, the motor control unit 200 generates the detection value Isns of the driving current I based on the voltage value Vsns that is obtained by amplifying the voltage across the two ends of the current detection resistor R1 (a two-end voltage) using a differential amplifier unit 230.

However, as described above, during the period T1, when the PWM+ is at the H level, the driving current flows in the following order: the power supply→Q1→L1→Q4→GND. Also, during the period T1, when the PWM+ is at the L level, the driving current flows in the following order: GND→Q3→L1→Q2→the power supply. That is, during the period T1, there are cases where the driving current flows in the direction from the power supply to GND and the case where the driving current flows in the direction from GND to the power supply. Note that the same applies to the period T2. Therefore, when the current detection resistor R1 is provided at the point C, the current that actually flows through the current detection resistor R1 does not match the detection value Isns of the driving current I that is detected by the motor control unit 200.

For this reason, as discussed in the aforementioned U.S. Pat. No. 5,574,344, it is required that the polarity of the voltage value Vsns is switched (reversed) as appropriate so as to match the polarity of the driving current I. In the present embodiment, the current value generation unit 204 that is provided in the motor control unit 200 performs processing to reverse the polarity of the voltage value Vsns based on the level of the PWM signal generated by a PWM generation unit 203. Thus, the current value generation unit 204 generates the detection value Isns (in actuality, a corrected detection value Isns*) of the driving current I that flows through the coil L1, based on the voltage value Vsns.

In FIG. 4, regarding the voltage value Vsns and the detection value Isns, sections corresponding to polarity reverse processing that is performed on the voltage value Vsns are indicated by dotted lines. As shown in FIG. 4, the motor control unit 200 does not reverse the polarity of the voltage value Vsns when PWM+ is at the H level (PWM− is at the L level), and performs processing to reverse the polarity of the voltage value Vsns when PWM+ is at the L level (PWM− is at the H level). In this way, the polarity of the voltage value Vsns is determined based on the PWM signals, and thus the detection value Isns that shows a waveform that is similar to the waveform of the actual driving current I is obtained based on the voltage value Vsns.

<Motor Control Unit 200>

The motor control unit 200 includes a current waveform generation unit 201, a PID control unit 202, the PWM generation unit 203, and the current value generation unit 204. The motor control unit 200 performs motor driving control by controlling the PWM signal that is to be supplied to the motor driving circuit 250, based on the result of detection of the driving current I that flows through the coil L1 of the motor. As described above, the driving current I is detected by using the current detection resistor R1 that is connected between: the source terminals of the FETs Q3 and Q4; and GND.

The voltage that is generated across the current detection resistor R1 (the two-end voltage) when current flows through the current detection resistor R1 is input to the differential amplifier unit 230. The differential amplifier unit 230 is constituted by an operational amplifier or the like. The differential amplifier unit 230 amplifies the end-to-end voltage across the current detection resistor R1, and outputs the amplified voltage to an A/D (analogue/digital) conversion unit 220. The A/D conversion unit 220 converts the voltage output from the differential amplifier unit 230, from an analogue value to a digital value, and outputs the voltage value Vsns, which is the digital value, to the motor control unit 200. The current value generation unit 204 in the motor control unit 200 generates the value Isns of the current that flows through the current detection resistor R1 (in actuality, the corrected detection value Isns*), based on the voltage value Vsns thus obtained. Note that although the differential amplifier unit 230 and the A/D conversion unit 220 are provided as blocks (circuits) that are independent of the motor control unit 200 or the motor driving circuit 250 in FIG. 1, the differential amplifier unit 230 and the A/D conversion unit 220 may be built into the motor control unit 200 or the motor driving circuit 250.

The current waveform generation unit 201 generates and outputs a target value Itgt of the driving current I that flows through the coil L1 of the motor that is to be driven, based on an instruction from a host control circuit (not shown) to the motor control unit 200. For example, in a case where a two-phase stepping motor is driven at a pulse rate of 1000 pps in a two-phase excitation mode using a winding current of 1 A, the current waveform generation unit 201 generates a square wave with a frequency of 250 Hz and an amplitude of 1 A as the target value Itgt of the driving current I.

The motor control unit 200 calculates a difference between the target value Itgt of the driving current I, which is output from the current waveform generation unit 201, and the detection value Isns of the driving current I (in actuality, the corrected detection value Isns*), which is output from the current value generation unit 204. The difference value thus obtained is input to the PID control unit 202. The PID control unit 202 determines (calculates) the duty ratio of the PWM signal that is to be output to the motor driving circuit 250, by performing PID calculations based on the input difference value. The PID control unit 202 outputs the duty ratio thus determined, to the PWM generation unit 203. Note that the P control is a control method for controlling the value that is to be controlled, based on a value that is proportional to a deviation between an instruction value and an estimated value. The I control is a control method for controlling the value that is to be controlled, based on a value that is proportional to a temporal integration of a deviation between an instruction value and an estimated value. The D control is a control method for controlling the value that is to be controlled, based on a value that is proportional to a temporal change in a deviation between an instruction value and an estimated value. In the present embodiment, the duty ratio is determined based on the PID control. However, the duty ratio may be determined based on the PI control. Note that the duty ratio indicates the ratio of the duration of an H level pulse to the duration of one cycle of a PWM signal. As described above, the PID control unit 202 controls the PWM generation unit 203 that generates PWM signals, based on the detection value Isns generated by the current value generation unit 204.

The PWM generation unit 203 generates PWM signals based on the duty ratio output from the PID control unit 202, and outputs the PWM signals thus generated to the motor driving circuit 250. Specifically, the PWM generation unit 203 generates, for each PWM signal cycle, a PWM signal (PWM+) with the duty ratio determined by the PID control unit 202, and a PWM signal (PWM−) that is in an antiphase relationship with the PWM signal (PWM+). As described above, PWM+ is used to drive the FETs Q1 and Q4, and PWM− is used to drive the FETs Q2 and Q3.

The current value generation unit 204 determines the polarity of the voltage value Vsns input from the A/D conversion unit 220, by using the above-described method. The current value generation unit 204 performs polarity reverse processing on the voltage value Vsns such that the polarity of the voltage value Vsns matches the polarity of the actual driving current I, based on the logical value (H or L) of the PWM signal (PWM+) generated by the PWM generation unit 203. Thus, the current value generation unit 204 generates the detection value Isns of the driving current I based on the voltage value Vsns.

<Timing of Detecting Driving Current I>

With the H bridge circuit as described above, if the pulse width (the period of the H level pulse or the L level pulse) of the PWM signals (PWM+ and PWM−) for driving the FETs Q1 to Q4 is extremely short, it is impossible to switch between the FETs in response to the PWM signals. In such a case, there is the possibility of an error occurring between the detection value Isns generated by the current value generation unit 204 and the actual driving current I. Specifically, although the direction in which the current flows through the current detection resistor R1 is not reversed when the level of the PWM signal changes, the current value generation unit 204 performs polarity reverse processing on the voltage value Vsns in synchronization with the PWM signal. As a result, an error occurs between the detection value Isns and the actual driving current I. Also, if the pulse width (the period of the H level pulse or the L level pulse) of the PWM signals (PWM+ and PWM−) is extremely short, there is the risk of an error occurring between the detection value Isns and the actual driving current I due to switching noise being superimposed on the detection value Isns. Switching noise is generated at switching between the H level and the L level.

In order to reduce such errors, in the present embodiment, the current value generation unit 204 detects the driving current during the longer period out of a period in which the PWM signal is at the H level (hereinafter referred to as "the H period") and a period in which the PWM signal is at the L level (hereinafter referred to as "the L period"), for each cycle of a PWM signal (for each cycle of generation of a PWM signal). Specifically, for example, when a duty ratio DR of the PWM signal is greater than or equal to 50%, the current value generation unit 204 samples the voltage value Vsns during the H period in each cycle of the PWM signal, and when the duty ratio DR of the PWM signal is smaller than 50%, the current value generation unit 204 samples the voltage value Vsns during the L period in each cycle of the PWM signal. The current value generation unit 204 generates the detection value Isns based on the voltage value Vsns thus sampled.

Figure 5:
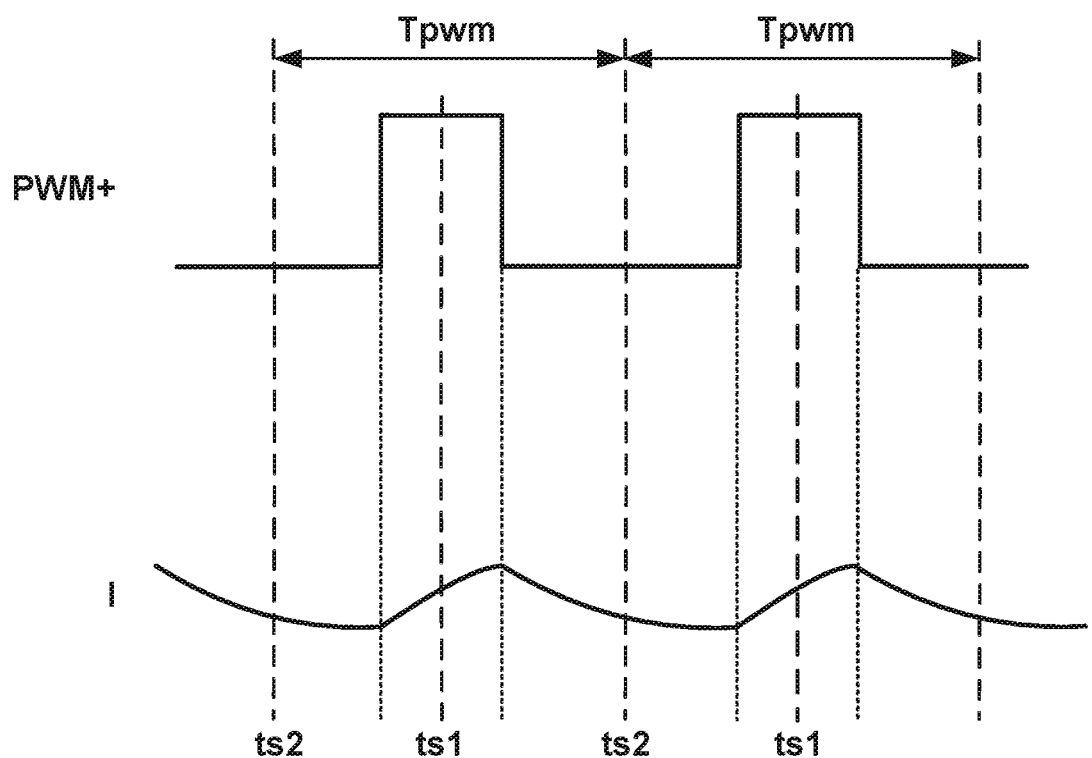
FIG. 5 is a diagram showing an example of the timing of detecting the driving current I.

In this way, the current value generation unit 204 samples the voltage value Vsns during the H period of the PWM signal or the L period of the PWM signal, once in each cycle of the PWM signal having a period Tpwm, and generates the detection value Isns based on the voltage value Vsns thus obtained. Here, FIG. 5 is a diagram showing an example of the timing of detecting the driving current I. Tpwm denotes the PWM period, ts1 denotes a time point in the H period at which sampling is performed, and ts2 denotes a time point in the L period at which sampling is performed. In the present embodiment, as shown in FIG. 5, the waveform of the PWM signal is formed such that the H period is provided in the middle of the PWM period Tpwm, and so as to be symmetrical with respect to the midpoint of the PWM period Tpwm. The time point ts1 is set to the midpoint of the H period. The time point ts2 is set to the midpoint of the L period.

In the present embodiment, the current value generation unit 204 samples the voltage value Vsns at the midpoint ts1 of the H period or the midpoint ts2 of the L period according to the duty ratio DR of the PWM signal, and generates the detection value Isns. In this way, the driving current I is detected at the midpoint of the H period or the L period of the PWM signal, and thus it is possible to prevent misdetection from occurring due to noise being generated when switching between the FETs is performed in response to the PWM signal.

<Distortion of Result of Detection of Driving Current I>

Figure 6:
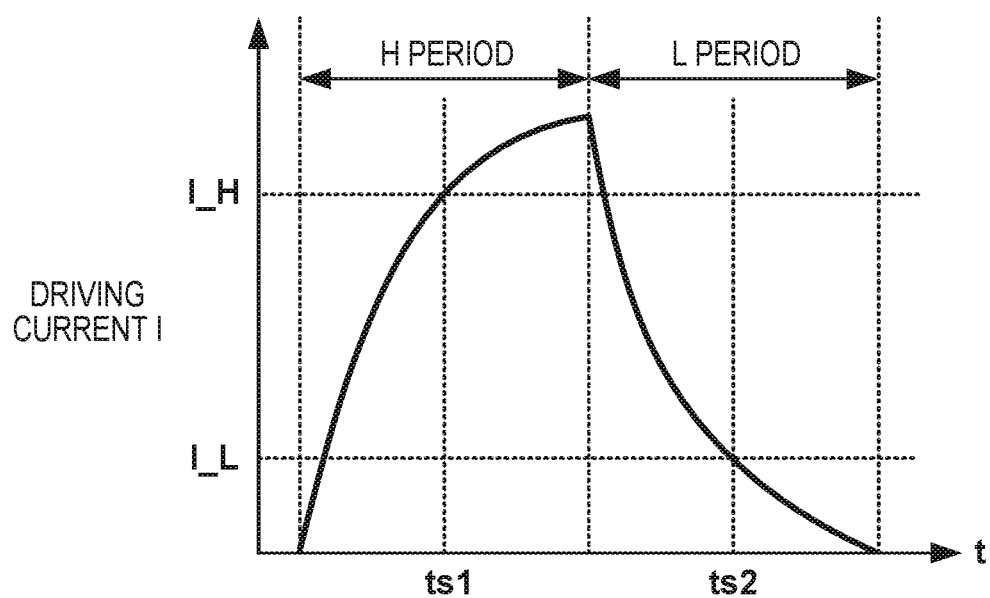
FIG. 6 is a diagram showing an example of a waveform of the driving current I that flows through a coil L1 of a motor during a period in which a PWM signal (PWM+) changes from an H level to an L level.

Next, a description will be given of distortion that occurs in the current waveform that indicates the result of detection of the driving current I, due to the transient response properties of the driving current I that flows through the coil L1 of the motor. FIG. 6 is a diagram showing an example of the waveform of the driving current I that flows through the coil L1 of the motor during a period in which the PWM signal (PWM+) supplied to the motor driving circuit 250 changes from the H level to the L level.

As shown in FIG. 6, the driving current I that flows through the coil L1 of the motor has a waveform with a predetermined curvature. This is because the coil L1 of the motor has a reactance component and a resistance component, and can be approximated as a series circuit having these components. In other words, the driving current I has transient response properties that vary along with a time constant τ that is determined by the reactance component and the resistance component of the coil L1 of the motor.

Due to the above-described properties of the driving current I, as shown in FIG. 6, in each cycle of the PWM signal, the value (I_H) of the driving current I at the time point ts1 in the H period of PWM+ is higher than the value (I_L) of the driving current I at the time point ts2 in the L period of the PWM+. The detection value Isns that is generated by the current value generation unit 204 has a similar tendency. That is, the driving current I is detected as a relatively high value at the time point ts1 in the H period of PWM+, and the driving current I is detected as a relatively low value at the time point ts2 in the L period of PWM+.

In this way, the detection value Isns of the driving current I that can be obtained in the case where the driving current I is detected in the H period of the PWM signal is different from that obtained in the case where the driving current I is detected in the L period of the PWM signal. Such a difference in the detection value Isns may cause distortion of the current waveform that indicates the result of detection of the driving current I.

Figure 7:
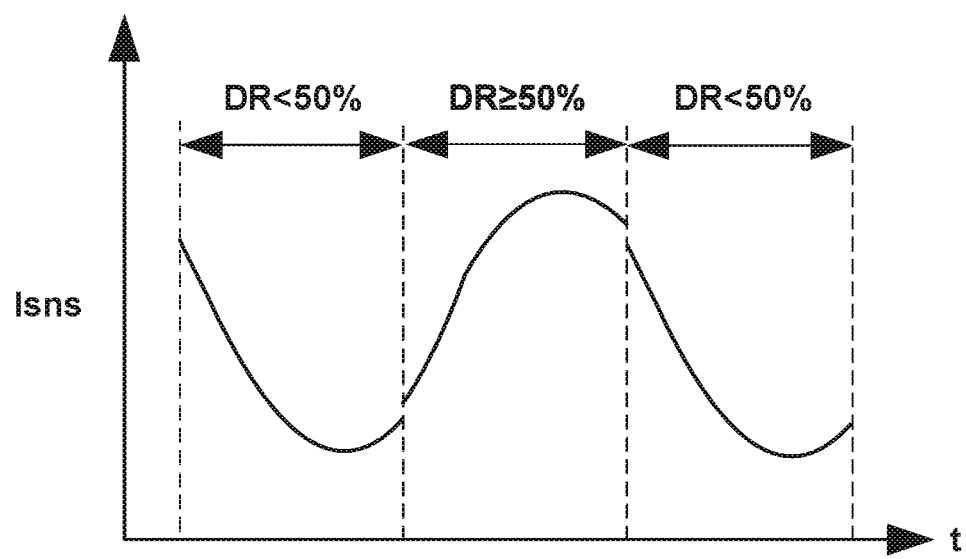
FIG. 7 is a diagram showing an example of a current waveform that shows a result of detection of the driving current I.

FIG. 7 is a diagram showing an example of a current waveform that shows the result of detection of the driving current I. In this example, a period in which the duty ratio DR of the PWM signal satisfies DR<50% and a period in which the duty ratio DR satisfies DR≥50% are repeated one after the other. The current waveform shown in FIG. 7 shows the result of detection of the driving current I in a case where the driving current I is detected once in each cycle of the PWM signal, in the H period if the duty ratio DR satisfies DR≥50%, and in the L period if the duty ratio DR satisfies DR<50%.

As described above, the current value detected in the H period and the current value detected in the L period are different from each other. As a result, as shown in FIG. 7, when the duty ratio DR changes from a value that is smaller than 50% to a value that is greater than or equal to 50%, or when the duty ratio DR changes from a value that is greater than or equal to 50% to a value that is smaller than 50%, the current waveform (the detection value Isns) shows a sudden change (a difference in level). In other words, the result of detection of the driving current I is distorted.

If generation of the PWM signal by the PWM generation unit 203 is controlled based on the result of detection of the driving current I in which distortion as shown in FIG. 7 has occurred, the duty ratio DR of the PWM signal to be generated shows a sudden change. As a result, there is the possibility of a failure such as variations in the rotational speed of the motor that is driven by the H bridge circuit, or vibrations in the motor, occurring in motor driving control.

<Processing for Correcting Detection Value of Driving Current I>

In the present embodiment, in order to reduce the distortion that occurs in the result of detection of the driving current I as described above, the current value generation unit 204 performs correction processing on the generated detection value Isns.

Specifically, the current value generation unit 204 corrects the detection value Isns by using a correction value that has a different polarity (sign) depending on whether the driving current I is detected in the H period or in the L period of the PWM signal (PWM+). If the driving current I is detected in the H period, the detection value Isns is a relatively high value. If this is the case, the current value generation unit 204 corrects the detection value Isns by using a correction value C1 (C1<0) for reducing the detection value Isns. If the driving current I is detected in the L period, the detection value Isns is a relatively low value. If this is the case, the current value generation unit 204 corrects the detection value Isns by using a correction value C2 (C2>0) for increasing the detection value Isns.

Figure 8:
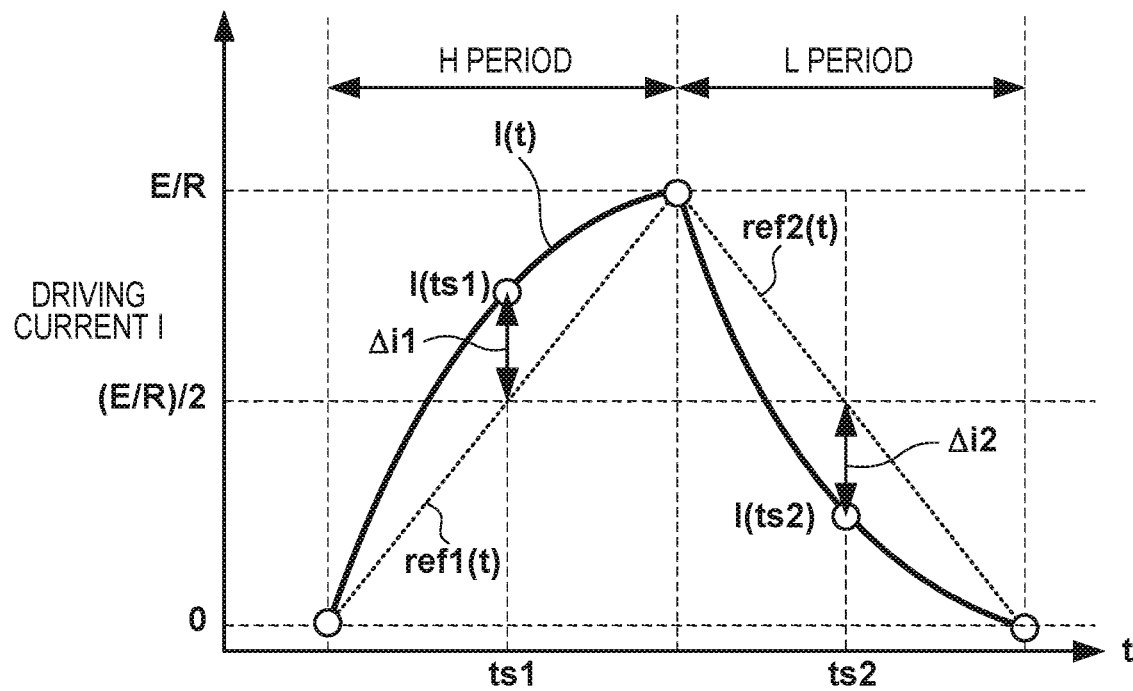
FIG. 8 is a diagram showing an example of correction of the detection value Isns of the driving current I.

FIG. 8 shows an example of the correction of the detection value Isns. FIG. 8 shows the driving current I(t), detection time points ts1 and ts2 at which the driving current I is detected, and linear reference functions ref1(t) and ref2(t) that are used as references for the correction of the detection value Isns. Note that t denotes time. The reference function ref1(t) shows a case where the driving current I linearly increases within the H period of the PWM signal (PWM+), and the reference function ref2(t) shows a case where the driving current I linearly decreases within the L period of the PWM signal (PWM+). Note that FIG. 8 shows, as an example, a case where a PWM signal whose duty ratio DR=50% is generated by the PWM generation unit 203.

As shown in FIG. 8, the value I(ts1) of the driving current at the detection time point ts1 in the H period is higher than the reference value ref1(ts1) indicated by the reference function by Δi1. Therefore, the correction value C1 for the H period is determined as C1=−Δi1 so that the detection value Isns of the driving current I can be reduced by Δi1. Also, the value I(ts2) of the driving current at the detection time point ts2 in the L period is lower than the reference value ref2(ts2) indicated by the reference function by Δi2. Therefore, the correction value C2 for the L period is determined as C2=Δi2 so that the detection value Isns of the driving current I can be increased by Δi2. The current value generation unit 204 corrects the detection value Isns by adding the correction value C1 or C2 to the detection value Isns of the driving current I.

Figure 9:
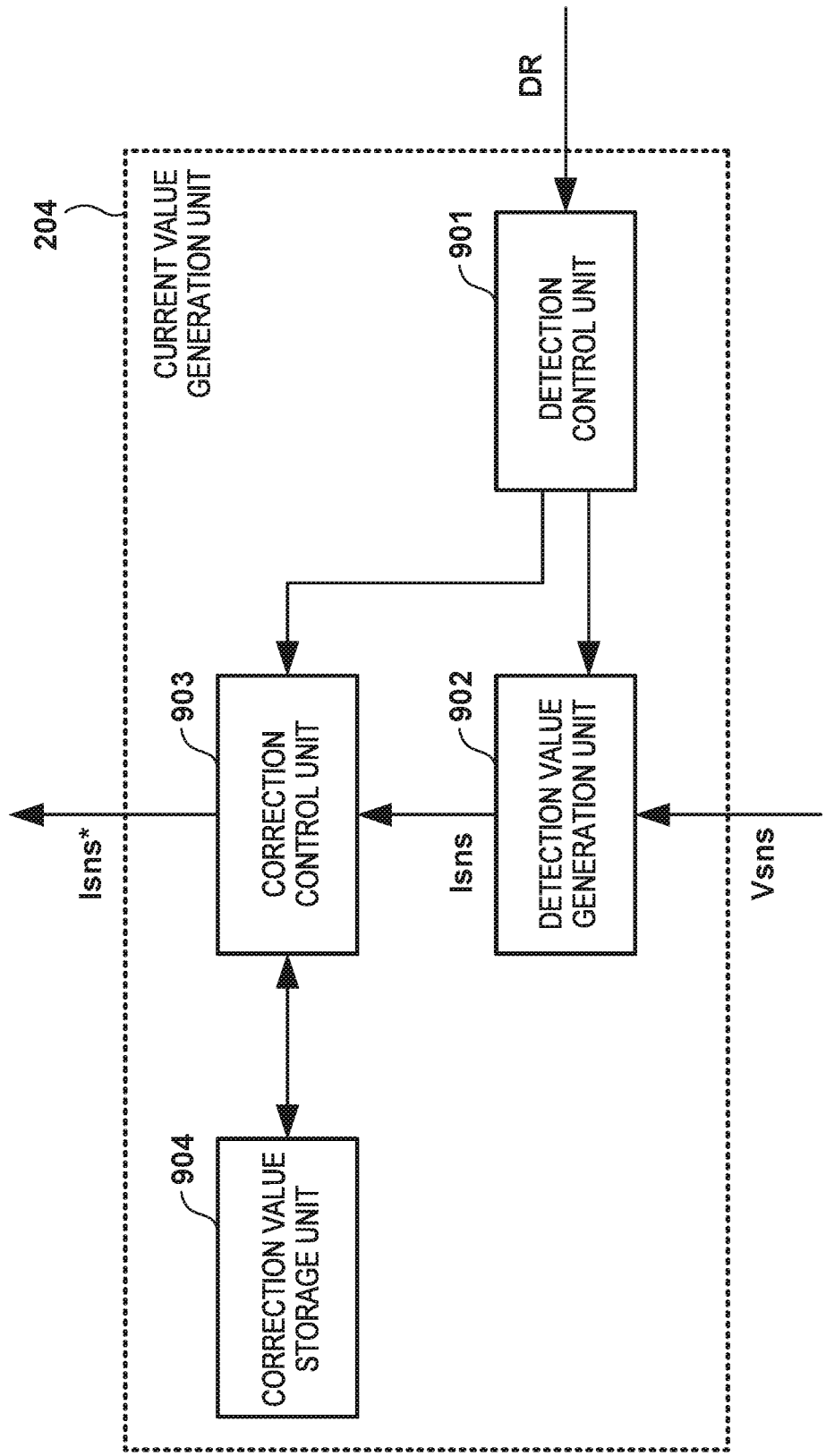
FIG. 9 is a diagram showing an example of a configuration of a current value generation unit 204.

FIG. 9 is a diagram showing an example of the configuration of the current value generation unit 204. The current value generation unit 204 includes a detection control unit 901, a detection value generation unit 902, a correction control unit 903, and a correction value storage unit 904.

The detection control unit 901 obtains the duty ratio DR of the PWM signal output from the PWM generation unit 203, and controls the detection value generation unit 902 and the correction control unit 903 based on the duty ratio DR thus obtained. The detection control unit 901 determines whether the driving current I is to be detected at the time point ts1 in the H period or at the time point ts2 in the L period, based on the duty ratio DR, for each cycle of the PWM signal having the period Tpwm. Specifically, if the duty ratio DR is greater than or equal to 50%, the detection control unit 901 determines that the driving current I is to be detected at the time point ts1, and if the duty ratio DR is smaller than 50%, the detection control unit 901 determines that the driving current I is to be detected at the time point ts2. Furthermore, the detection control unit 901 controls the detection value generation unit 902 to detect the driving current I at the time point thus determined. Also, the detection control unit 901 instructs the correction control unit 903 regarding which value, out of the correction value C1 for the H period and the correction value C2 for the L period, is to be used to correct the detection value Isns.

The detection value generation unit 902 samples the voltage value Vsns output from the A/D conversion unit 220, at the detection time point ts1 or ts2, and generates the detection value Isns based on the voltage value Vsns thus obtained. Note that the detection value generation unit 902 performs the above-described polarity reverse processing on the voltage value Vsns (or the detection value Isns thus generated). In this way, the detection value generation unit 902 generates and outputs the detection value Isns of the driving current I that flows through the coil L1 of the motor, based on the voltage generated across the current detection resistor R1.

The correction control unit 903 corrects the detection value Isns generated by the detection value generation unit 902, according to an instruction from the detection control unit 901. Specifically, the correction control unit 903 corrects the detection value Isns by adding the correction value C1 or C2 read from the correction value storage unit 904, to the detection value Isns, and outputs the corrected detection value Isns*. The correction value storage unit 904 stores the correction values C1 and C2 that have been determined in advance.

<Processing for Obtaining Correction Values>

FIG. 10 is a flowchart showing procedures for performing processing for obtaining the correction values C1 and C2 that are used by the current value generation unit 204 (the correction control unit 903). Processing for obtaining the correction values C1 and C2 is performed during a period in which the PID control unit 202 is not performing feedback control based on the result of detection of the driving current I. Note that the steps shown in FIG. 10 are realized by the CPU 410 reading out and executing a program that is stored in a storage device. However, the steps may be realized by one or more circuits that realize the functions of the blocks shown in FIGS. 1 and 9. Note that although FIG. 10 shows, as an example, procedures for obtaining the correction values in a case where the PWM generation unit 203 generates a PWM signal whose duty ratio DR=50%, the duty ratio DR may have a value other than 50%.

First, in step S101, the PWM generation unit 203 generates PWM signals (PWM+ and PWM−) whose duty ratio DR=50%, and outputs the PWM signals to the motor driving circuit 250. As a result, the driving current I shown in FIG. 8 flows through the coil L1 of the motor.

Next, in step S102, the current value generation unit 204 (the detection value generation unit 902) samples the voltage value Vsns at both the detection time point ts1 in the H period and the detection time point ts2 in the L period, and generates a detection value I(ts1) of the driving current detected at the detection time point ts1 and the detection value I(ts2) of the driving current detected at the detection time point ts2.

Next, in step S103, the current value generation unit 204 (the correction control unit 903) calculates a difference Idiff between the detection value I(ts1) and the detection value I(ts2) by using the following equation (1).

$$I\text{diff} = I(ts1) - I(ts2) \tag{1}$$

Thereafter, in step S104, the current value generation unit 204 (the correction control unit 903) calculates $\Delta i1$ and $\Delta i2$ shown in FIG. 8 based on the difference Idiff calculated in step S103, thereby determining the correction values C1 and C2. Specifically, the current value generation unit 204 (the correction control unit 903) calculates $\Delta i1$ and $\Delta i2$ by dividing the difference Idiff calculated in step S103 by 2, thereby determining the correction values C1 and C2.

The following describes a method for determining the correction values C1 and C2. Note that in the following description, a voltage E is a voltage that is applied to the coil L1 by the driving power supply, R denotes the resistance component of the coil L1, and L denotes the reactance component (inductance) of the coil L1.

$\Delta i1$ and $\Delta i2$ shown in FIG. 8 can be expressed by the following equations (2) and (3).

$$\Delta i1 = I(ts1) - ref1(ts1) \tag{2}$$

$$\Delta i2 = ref2(ts2) - I(ts2) \tag{3}$$

As described above, the reference functions $ref1(t)$ and $ref2(t)$ are functions that linearly change. The detection time point ts1 is the midpoint of the H period, and the detection time point ts2 is the midpoint of the L period. Therefore, as shown in FIG. 8, $ref1(ts1)$ and $ref2(ts2)$ are equal to $(E/R)/2$. As a result, the equations (2) and (3) are converted to the following equations (4) and (5).

$$\Delta i1 = -(E/R)/2 + I(ts1) \tag{4}$$

$$\Delta i2 = (E/R)/2 - I(ts2) \tag{5}$$

As a result, the absolute value of the difference Idiff is expressed by the following equation (6) using the equations (4) and (5).

$$|\text{diff}| = |I(ts1) - I(ts2)| = \Delta i1 + \Delta i2 \tag{6}$$

As described above, the absolute value of the difference |diff| between the detection value Isns at the detection time point ts1 and the detection value Isns at the detection time point ts2 is equal to the sum of $\Delta i1$ and $\Delta i2$.

Also, if the H period and the L period each starts at t=0, a current value $i1(t)$ of the driving current at a time point t in the H period is expressed by the following equation (7). Also, a current value $i2(t)$ of the driving current at the time point t in the L period is expressed by the following equation (8).

$$i1(t) = E/R * (1 - e^{-(R/L)t}) \tag{7}$$

$$i2(t) = E/R * e^{-(R/L)t} \tag{8}$$

Note that $i1(t)$ and $i2(t)$ are equivalent to a transient solution to the current that flows through the coil L1 when the coil L1 of the motor is approximated as a series circuit that has the reactance component and the resistance component of the coil L1. The equation (7) expresses the transient current that is generated when the voltage E is applied (at the start time of the H period of the PWM signal). The equation (8) expresses the transient current that is generated in a case where the applied voltage is switched to 0 V (at the start time of the L period of the PWM signal) in a situation where the driving current has reached E/R due to the application of the voltage E.

Also, if the H period and the L period each starts at t=0, the reference functions $ref1(t)$ and $ref2(t)$ are expressed by the following equations (9) and (10).

$$ref1(t) = E/R/T1 * t \tag{9}$$

$$ref2(t) = E/R * (1 - (t/T2)) \tag{10}$$

Note that T1 is a value that indicates the length of the H period, and T2 is a value that indicates the length of the L period. When the duty ratio DR is 50%, T1 and T2 are the same value.

Furthermore, the difference between the current value $i1(t)$ of the driving current I and the reference function $ref1(t)$, i.e. a difference $i1\text{diff}(t)$ between the equation (7) and the equation (9) is expressed by the following equation (11). Also, the difference between the current value $i2(t)$ of the driving current I and the reference function $ref2(t)$, i.e. a difference $i2\text{diff}(t)$ between the equation (8) and the equation (10) is expressed by the following equation (12).

$$i1\text{diff}(t) = E/R * (1 - e^{-(R/L)t} - t/T1) \tag{11}$$

$$i2\text{diff}(t) = -E/R * (1 - e^{-(R/L)t} - t/T2) \tag{12}$$

As described above, when the duty ratio DR is 50%, T1 and T2 are the same value. Therefore, the absolute value of $i1\text{diff}(t)$ and the absolute value of $i2\text{diff}(t)$ are the same ($|i1\text{diff}(t)| = |i2\text{diff}(t)|$). Also, the detection time point ts1 is T1/2 and the detection time point ts2 is T2/2, and therefore, if the duty ratio DR is 50%, the period from the start time of the H period to the detection time point ts1 and the period from the start time of the L period to the detection time point ts2 are the same. Therefore, the relationship expressed by the following equation (13) can be obtained based on the equations (2), (3), (11), and (12).

$$\Delta i1 = |i1\text{diff}(T/2)| = |i2\text{diff}(T/2)| = \Delta i2 \tag{13}$$

That is, $\Delta i1 = \Delta i2$ is true.

Therefore, as expressed by the equation (6) and the equation (13), it is possible to calculate $\Delta i1$ and $\Delta i2$ by dividing the absolute value (|Idiff|) of the difference between the detection value I(ts1) and the detection value I(ts2) by 2. Specifically, it is possible to calculate $\Delta i1$ and $\Delta i2$ by using the following equation (14).

$$|I\text{diff}|/2 = (\Delta i1 + \Delta i2)/2 = \Delta i1 = \Delta i2 \tag{14}$$

The current value generation unit 204 (the correction control unit 903) determines the correction values C1 and C2 as shown in the following equations (15) and (16), based on $\Delta i1$ and $\Delta i2$ obtained in step S103 in the above-described manner.

$$C1 = -\Delta i1 \tag{15}$$

$$C2 = \Delta i2 \tag{16}$$

Next, in step S105, the current value generation unit 204 (the correction control unit 903) stores the correction values C1 and C2 thus determined, in the correction value storage unit 904.

Thus, the current value generation unit 204 obtains the correction values.

<Procedures for Motor Driving Control>

Next, with reference to FIG. 11, a description will be given of procedures for motor driving control that is performed by the motor control unit 200 according to the present embodiment. Note that the steps shown in FIG. 11 are realized by the CPU 410 executing a program that is stored in a storage device. However, the steps may be realized by one or more circuits that realize the functions of the blocks shown in FIGS. 1 and 9.

In step S201, the motor control unit 200 starts driving the motor that is to be driven, based on an instruction from the CPU 410. As a result, the current value generation unit 204 starts processing for generating the detection value Isns of the driving current I based on the voltage value Vsns output from the A/D conversion unit 220.

The steps S202 to S207 in the following description are executed by the current value generation unit 204 in each cycle where a PWM signal that has the period Tpwm is generated by the PWM generation unit 203.

If the duty ratio DR output from the PWM generation unit 203 is greater than or equal to 50% in step S202, the detection control unit 901, in step S203, samples the voltage value Vsns at the time point ts1 in the H period, and controls the detection value generation unit 902 so that the detection value Isns is generated. As a result, the detection value generation unit 902 samples the voltage value Vsns at the time point ts1, and generates the detection value Isns.

Thereafter, in step S204, the detection control unit 901 controls the correction control unit 903 so that the detection value Isns thus generated is corrected by using the correction value C1. As a result, the correction control unit 903 corrects the detection value Isns by adding the correction value C1 (C1<0) to the detection value Isns thus obtained. Then, the correction control unit 903 outputs the corrected detection value Isns*. Thereafter, the CPU 410 proceeds to step S208.

If the duty ratio DR output from the PWM generation unit 203 is smaller than 50% in step S202, the detection control unit 901, in step S205, samples the voltage value Vsns at the time point ts2 in the L period, and controls the detection value generation unit 902 so that the detection value Isns is generated. As a result, the detection value generation unit 902 samples the voltage value Vsns at the time point ts2, and generates the detection value Isns.

Next, in step S206, the detection control unit 901 controls the detection value generation unit 902 so that the detection value generation unit 902 reverses the polarity of the detection value Isns thus generated (i.e. the polarity of the voltage value Vsns). As a result, the detection value generation unit 902 reverses the polarity of the detection value Isns thus generated (i.e. the polarity of the voltage value Vsns).

Thereafter, in step S207, the detection control unit 901 controls the correction control unit 903 so that the correction control unit 903 corrects the detection value Isns thus generated by using the correction value C2. As a result, the correction control unit 903 corrects the detection value Isns by adding the correction value C2 (C2>0) to the detection value Isns thus reversed. Then, the correction control unit 903 outputs the corrected detection value Isns*. Thereafter, the CPU 410 proceeds to step S208.

Thereafter, the motor control unit 200 repeatedly performs the above-described processing steps until an instruction to end the motor driving control is output from the CPU 410 to the motor control unit 200.

As described above, the current value generation unit 204 according to the present embodiment detects the driving current I based on the voltage that is generated across the current detection resistor R1, and corrects the generated detection value Isns by using the predetermined correction value C1 or C2. Specifically, if the driving current I is detected in the H period of the PWM signal, the current value generation unit 204 corrects the detection value Isns by using the correction value C1. On the other hand, if the driving current I is detected in the L period of the PWM signal, the current value generation unit 204 corrects the detection value Isns by using the correction value C2 having a polarity that is different from the polarity of the correction value C1. As a result, distortion that occurs in the result of detection of the driving current I that flows through the coil L1 of the motor can be reduced. Consequently, it is possible to prevent variations in the rotational speed or vibrations from occurring in the motor by performing motor driving control based on the result of detection of the driving current I.

Second Embodiment

In the first embodiment, the detection value Isns of the driving current I is corrected by using the correction values C1 and C2 that has been determined in advance based on a PWM signal whose duty ratio DR=50%. In the second embodiment, a description will be given of an example in which the correction values C1 and C2 are adjusted in order to improve the accuracy when correcting the detection value Isns. In the present embodiment, the correction values C1 and C2 are adjusted according to at least one of: the duty ratio DR of the PWM signal; the detection value of the driving current at the time the H period and the L period start; the induced voltage (counter voltage) that is induced across the coil L1 due to the rotation of the rotor of the motor that is to be driven. The following describes methods for adjusting the correction values C1 and C2. Note that descriptions of components that are the same as those in the first embodiment are omitted from the following description.

First, a description will be given of a method for adjusting the correction values C1 and C2 according to the duty ratio DR of the PWM signal.

T1 in the equation (11) and T2 in the equation (12) in the first embodiment are the same value when the duty ratio DR of the PWM signal is 50% whereas they are different values when the duty ratio DR is not 50%. For example, in the case where DR>50% is satisfied, T1 in the equation (11) is greater than T1 in the case where the duty ratio DR is 50%, and T2 in the equation (12) is smaller than T2 in the case where the duty ratio DR is 50%. In the case where DR<50% is satisfied, T1 in the equation (11) is smaller than T1 in the case where the duty ratio DR is 50%, and T2 in the equation (12) is greater than T2 in the case where the duty ratio DR is 50%. As described above, the detection time point ts1 is at t=T1/2, and the detection time point ts2 is at t=T2/2. Therefore, if the duty ratio DR is not 50%, the period from the start of the H period to the detection time point ts1 and the period from the start of the L period to the detection time point ts2 are different. As a result, Δi1 and Δi2 differ from each other.

In this way, Δi1 and Δi2 change depending on the duty ratio DR. Therefore, the current value generation unit 204 determines (calculates) Δi1 and Δi2 for each duty ratio DR of the PWM signal, and adjusts the correction values C1 and C2 based on Δi1 and Δi2 thus determined. Consequently, it is possible to correct the detection value Isns by using more appropriate correction values.

Next, a description will be given of a method for adjusting the correction values C1 and C2 according to the detection value of the driving current at the start of the H period and the L period.

The equation (7) in the first embodiment expresses the case where the driving current at the start time t=0 of the H period (an initial current $i_{ini1}$) is 0. On the other hand, if the initial current $i_{ini1}$ is not 0, the driving current $i1(t)$ is expressed by the following equation.

$$i1(t)=E/R*(1-e^{-(R/L)t})+i_{ini1}*e^{-(R/L)t} \quad (17)$$

Similarly, the driving current i2(t) in the equation (8) for the L period is expressed by the following equation (18) using an initial current $i_{ini2}$.

$$i2(t)=E/R*e^{-(R/L)t}+i_{ini2}*e^{-(R/L)t} \quad (18)$$

In this way, the current waveform changes depending on the initial currents $i_{ini1}$ and $i_{ini2}$. As a result, there is the possibility of Δi1 and Δi2 changing as well. Therefore, if the initial current values of the H period and the L period are not 0, the current value generation unit 204 determines (calculates) Δi1 and Δi2 for each detection value Isns (initial current value) at the start time of the H period and the L period, and adjusts the correction values C1 and C2 based on Δi1 and Δi2 thus determined. Consequently, it is possible to correct the detection value Isns by using more appropriate correction values.

Next, a description will be given of a method for adjusting the correction values C1 and C2 according to the induced voltage (the counter voltage) that is induced across the coil L1 due to the rotation of the rotor of the motor.

In the first embodiment, the voltage E applied to the coil L1 of the motor is described as a voltage that is applied from a driving power supply. However, in reality, the rotor of the motor that is to be driven rotates, and accordingly an induced voltage e corresponding to the rotational speed of the rotor of the motor is generated in the coil L1. If this induced voltage e is taken into consideration, the equations (17) and (18) can be converted to the following equations (19) and (20).

$$i1(t)=(E-e)/R*(1-e^{-(R/L)t})+i_{ini1}*e^{-(R/L)t} \quad (19)$$

$$i2(t)=(E-e)/R*e^{-(R/L)t}+i_{ini2}*e^{-(R/L)t} \quad (20)$$

These equations express that a voltage that is obtained by subtracting the induced voltage e from the voltage E of the driving power supply is applied to the coil L1.

In this way, the current waveform changes depending on the initial current and the induced voltage e that is generated in the coil L1. As a result, there is the possibility of Δi1 and Δi2 changing as well. Therefore, the current value generation unit 204 determines (calculates) Δi1 and Δi2 based on the induced voltage e that is generated in the coil L1, and determines (adjusts) the correction values C1 and C2 based on Δi1 and Δi2 thus determined, by using Δi1 and Δi2. Consequently, it is possible to correct the detection value Isns by using more appropriate correction values.

In the present embodiment, it is assumed that the above-described correction values C1 and C2 are determined based on measurements and studies prior to the shipment of the motor driving apparatus, and are stored in the correction value storage unit 904 in advance in association with at least one out of the duty ratio DR, the value of the initial current, and the induced voltage. If this is the case, the correction control unit 903 can read out the correction values corresponding to the duty ratio DR, etc. from the correction value storage unit 904.

Also, processing for obtaining the correction values C1 and C2 may be performed during a period in which the PID control unit 202 is not performing feedback control based on the result of detection of the driving current I. If this is the case, the correction values C1 and C2 determined through the obtaining processing are stored in the correction value storage unit 904 in association with at least one out of the duty ratio DR, the value of the initial current, and the induced voltage. The correction control unit 903 reads out and uses the correction values corresponding to the duty ratio DR, etc., from the correction value storage unit 904.

Note that, in the first and second embodiments, a description has been given of a case where the detection value Isns is corrected (the detection value is increased or reduced) according to the level (the H level or the L level) of PWM+ at the time the driving current I is detected. However, it is also possible to correct the detection value Isns according to the level (the H level or the L level) of PWM−, which is in an antiphase relationship with PWM+, at the time the driving current I is detected. If this is the case, the correction value C1 for the H period of PWM+ is used as the correction value for the L period of PWM−, and the correction value C2 for the L period of PWM+ is used as the correction value for the H period of PWM−.

Third Embodiment

In the third embodiment, a description will be given of an example in which feedback control based on the feedback of the detection value Isns of the driving current I, generated by the current value generation unit 204 described in the first and second embodiments, is performed through vector control. Note that descriptions of components that are the same as those in the first and second embodiments are omitted from the following description.

<Motor Control Unit 200>

Figure 12:
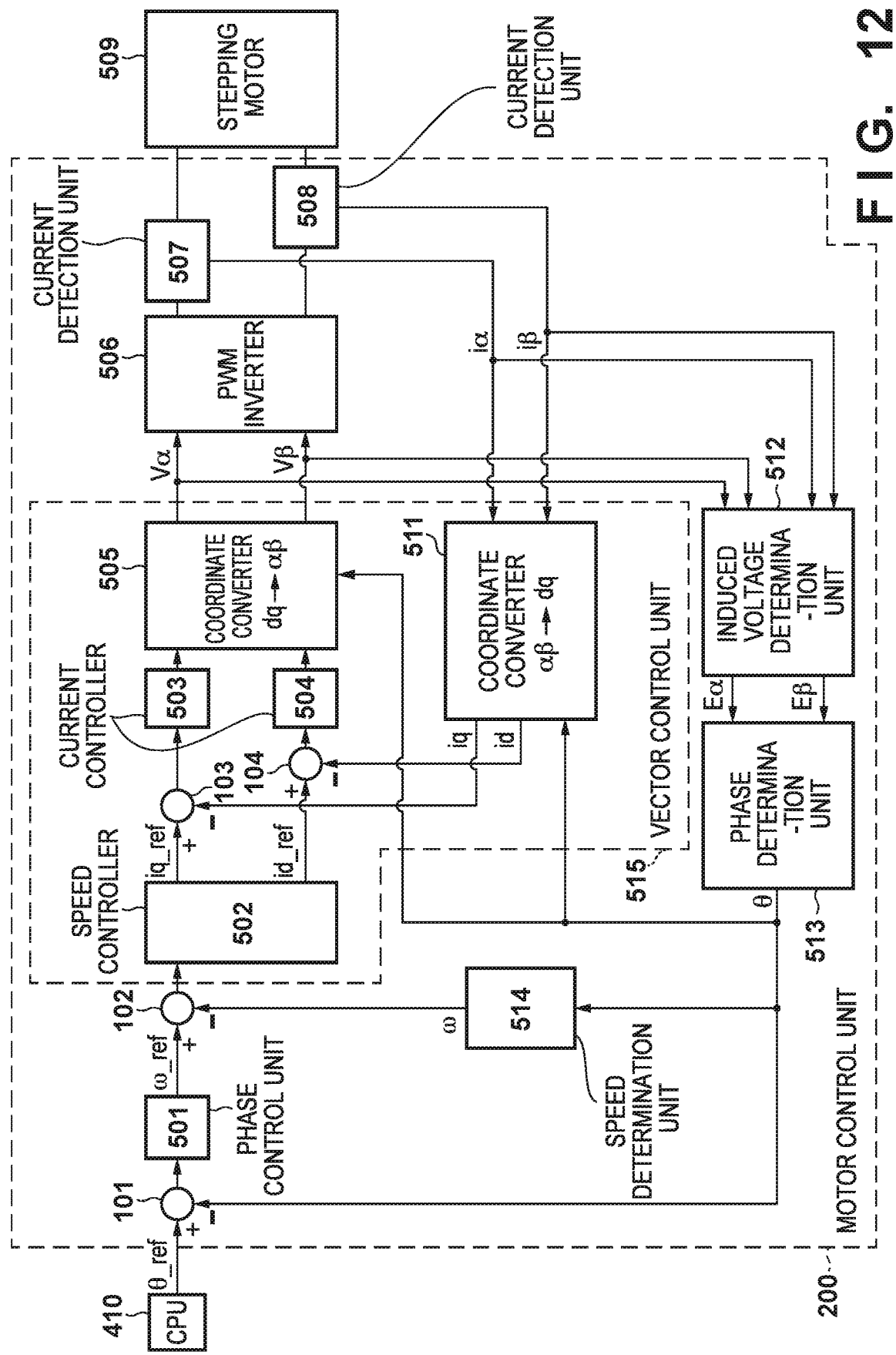
FIG. 12 is a diagram showing an example of a configuration of a motor control unit 200 that employs vector control.

FIG. 12 is a diagram showing an example of the configuration of the motor control unit 200 that is a motor driving apparatus according to the present embodiment. The motor control unit 200 drives a stepping motor 509 that is to be driven, by supplying driving currents (phase currents) to the windings (the coils L1 and L2 shown in FIG. 15) of the stepping motor 509 corresponding to the respective phases. The CPU 410 shown in FIG. 12 is an external controller of the motor control unit 200 (a host control circuit in the image forming apparatus 100). The CPU 410 generates an instruction phase (θ_ref) that indicates the target phase (rotational phase) of the rotor of the stepping motor 509, and outputs the instruction phase to the motor control unit 200. For example, the instruction phase θ_ref is a pulsed square wave signal, and one pulse corresponds to the minimum amount of change in the rotational angle of the stepping motor. Note that an instruction speed ω_ref that indicates the target rotational speed of the rotor of the motor is calculated (determined) as a frequency that corresponds to θ_ref. Upon starting the sequence for driving the motor, the CPU 410 outputs the instruction phase θ_ref thus generated to the motor control unit 200 in cycles (control cycles) that have a predetermined period. The motor control unit 200 performs phase control and speed control on the stepping motor 509 according to the instruction phase θ_ref provided by the CPU 410.

<Vector Control>

The motor control unit 200 according to the present embodiment realizes driving control for the stepping motor 509 through vector control. The following schematically describes vector control performed by the motor control unit 200 on the stepping motor 509, with reference to FIGS. 12 and 13.

In the motor control unit 200, a PWM inverter 506 supplies a driving current to the stepping motor 509 in response to driving voltages Vα and Vβ that are output from a vector control unit 515, and thus the stepping motor 509 is driven. Note that, as shown in FIG. 12, the vector control unit 515 includes a speed determiner 502, current controllers 503 and 504, and coordinate converters 505 and 511.

Figure 13:
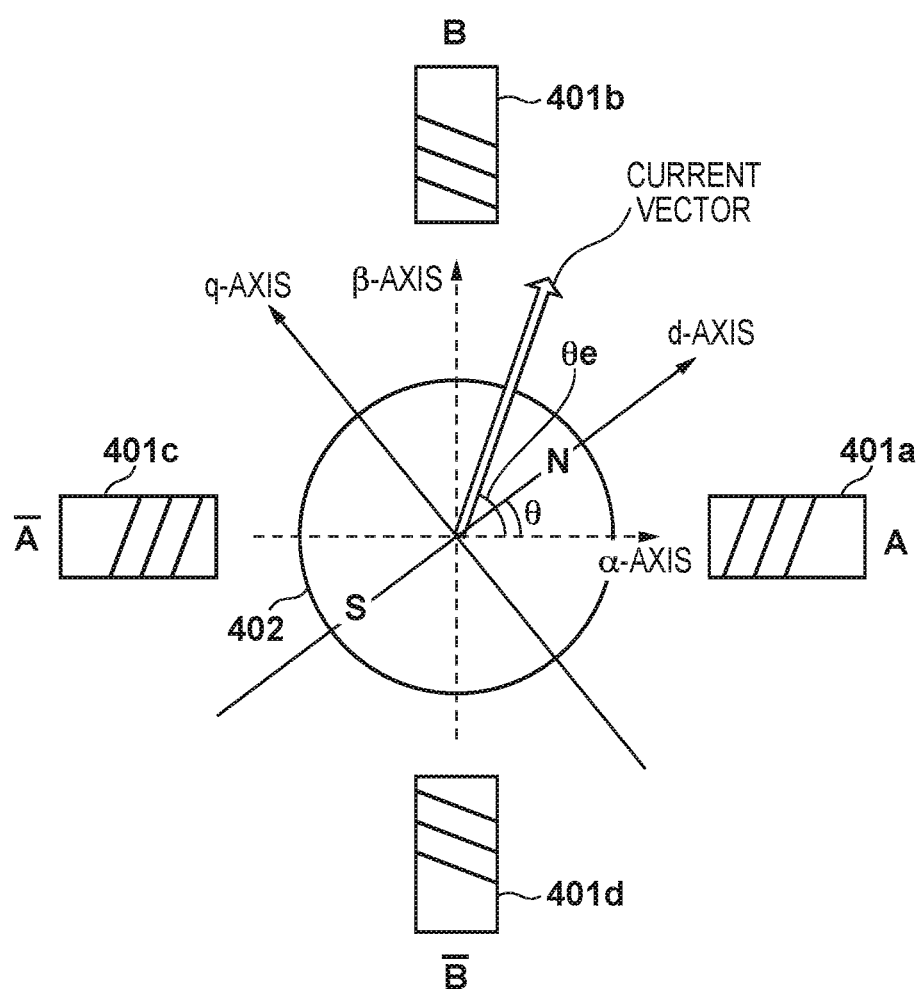
FIG. 13 is a diagram showing a relationship between a motor and d- and q-axes of a rotating coordinate system.

Here, FIG. 13 is a diagram showing a relationship between the two-phase motor having the A-phase and the B-phase and the d-axis and the q-axis of the rotating coordinate system. In the drawing, in a stationary coordinate system, the axis corresponding to the A-phase winding is defined as an α-axis, and the axis corresponding to the B-phase winding is defined as a β-axis. Also, the angle formed by the α-axis of the stationary coordinate system and the direction of the magnetic flux (d-axis) generated by the magnetic poles of a permanent magnet used as the rotor is defined as an angle θ. In this case, the phase (the rotational phase) of the rotor of the stepping motor 509 is represented as the angle θ. In vector control, as shown in FIG. 13, the rotating coordinate system defined with the phase θ of the rotor of the stepping motor 509 as a reference is used. The rotating coordinate system is represented using the d-axis, which extends along the direction of magnetic flux of the rotor, and the q-axis, which extends along the direction that has advanced from the d-axis by 90 degrees (the axis that is orthogonal to the d-axis).

The motor control unit 200 performs vector control to control the driving currents that are to be supplied to the windings of the stepping motor 509 by using current values in the rotating coordinate system defined with the phase θ of the stepping motor 509 as a reference. In vector control, a current vector corresponding to the driving currents that flow through the A-phase winding of the stepping motor 509 and the B-phase winding of the stepping motor 509 is converted from a vectors in the stationary coordinate system represented by the α-axis and the β-axis to vectors in the rotating coordinate system represented by the d-axis and the q-axis. As a result of such a coordinate conversion, the driving currents supplied to the windings of the stepping motor 509 are represented by the direct current d-axis component (the d-axis current) and the direct current q-axis component (the q-axis current) in the rotating coordinate system. In this case, the q-axis current corresponds to the torque current component (a first current component) that generates torque on the rotor of the stepping motor 509, and is a current that contributes to the rotation of the rotor. The d-axis current corresponds to the excitation current component (a second current component) that affects the strength of the magnetic flux that penetrates through the windings of the stepping motor 509. The motor control unit 200 realizes vector control for the stepping motor 509 by controlling the q-axis current and the d-axis current in the rotating coordinate system independent of each other.

Specifically, the motor control unit 200 estimates (determines) the rotational phase of the rotor of the stepping motor 509 and the rotational speed of the rotor of the stepping motor 509, and performs vector control based on the result of estimation. As shown in FIG. 12, the motor control unit 200 includes three control loops that are respectively based on feedback to a phase control unit 501, the speed controller 502, and the current controllers 503 and 504, and realizes vector control by using these control loops. Note that, in the motor control unit 200 shown in FIG. 12, the rotational phase θ of the rotor of the stepping motor 509 is determined by an induced voltage determination unit 512 and a phase determination unit 513. Also, the rotational speed ω of the stepping motor 509 is determined by a speed determination unit 514 based on the rotational phase θ determined by the phase determination unit 513.

The outermost control loop, which includes the phase controller 501, performs phase control on the rotor of the stepping motor 509 based on the rotational phase θ of the rotor of the stepping motor 509. The instruction phase θ_ref is output from the CPU 410 to the motor control unit 200.

A subtractor 101 calculates a deviation between the instruction phase θ_ref and the rotational phase θ of a rotor 402 of the stepping motor 509 output from the phase determination unit 513, and outputs the deviation to the phase control unit 501.

The phase control unit 501 generates the instruction speed ω_ref based on proportional control (P), integral control (I), and differential control (D) such that the deviation output from the subtractor 101 decreases, and outputs the instruction speed ω_ref. Specifically, the phase control unit 501 generates the instruction speed ω_ref such that the deviation becomes 0, and outputs the instruction speed ω_ref to the subtractor 102. Note that although the phase control unit 501 in the present embodiment generates the instruction speed ω_ref based on PID control, the phase control unit 501 may generate the instruction speed ω_ref based on PI control, for example. In this way, the phase control unit 501 performs phase control of the rotor of the stepping motor 509.

In the control loop that includes the speed controller 502, speed control is performed on the rotor of the stepping motor 509 based on the rotational speed ω of the rotor of the stepping motor 509.

The subtractor 102 calculates the deviation between the rotational speed ω of the rotor 402 of the stepping motor 509 output from the speed determination unit 514 and the instruction speed ω_ref output from the phase control unit 501, and outputs the deviation to the speed controller 502.

The speed controller 502 generates a q-axis current instruction value iq_ref and a d-axis current instruction value id_ref based on proportional control (P), integral control (I), and differential control (D) such that the deviation output from the subtractor 102 decreases, and outputs the q-axis current instruction value iq_ref and the d-axis current instruction value id_ref. Specifically, the speed controller 502 generates the q-axis current instruction value id_ref and outputs the q-axis current instruction value id_ref to a subtractor 103, and generates the d-axis current instruction value id_ref and outputs the d-axis current instruction value id_ref to a subtractor 104, such that the deviation becomes 0. Although the speed controller 502 in the present embodiment generates the q-axis current instruction value id_ref and the d-axis current instruction value id_ref based on PID control, the speed controller 502 may generate the q-axis current instruction value id_ref and the d-axis current instruction value id_ref based on PI control, for example. Note that the speed controller 502 in the present embodiment corresponds to the current waveform generation unit 201 in the first and second embodiments. Note that, if a permanent magnet is used as the rotor 402, the d-axis current instruction value id_ref that affects the strength of the magnetic flux that penetrates through the winding is usually set to 0. However, the present invention is not limited in this way.

In the control loop that includes the current controllers 503 and 504, the driving currents that are to be supplied to the windings of the stepping motor 509 corresponding to the respective phases are controlled based on the detection values of the driving currents that flow through the windings of the stepping motor 509 corresponding to the respective phases.

The driving currents that flow through the windings of the stepping motor 509 corresponding to the A-phase and the B-phase are detected by current detection units 507 and 508. The current values of the driving currents thus detected are expressed by the following equations using a phase θe of the current vector shown in FIG. 13, where iα and iβ denote the current values in the stationary coordinate system. Note that the phase θe of the current vector is defined as an angle that is formed by the α-axis and the current vector. I denotes the magnitude of the current vector.

$$i\alpha = I^* \cos \theta e \quad (21)$$

$$i\beta = I^* \sin \theta e \quad (22)$$

These current values iα and iβ are input to the coordinate converter 511 and the induced voltage determination unit 512.

The coordinate converter 511 performs coordinate conversion to convert the current values iα and iβ to a current value iq of the q-axis current and a current value id of the d-axis current in the rotating coordinate system, by using the following equations.

$$id = \cos \theta^* i\alpha + \sin \theta^* i\beta \quad (23)$$

$$iq = -\sin \theta^* i\alpha + \cos \theta^* i\beta \quad (24)$$

The current value iq output from the coordinate converter 511 and the q-axis current instruction value id_ref output from the speed controller 502 are input to the subtractor 103. The subtractor 103 calculates the deviation between the q-axis current instruction value id_ref and the current value iq, and outputs the deviation to the current controller 503.

Also, the current value id output from the coordinate converter 511 and the d-axis current instruction value id_ref output from the speed controller 502 are input to the subtractor 104. The subtractor 104 calculates the deviation between the d-axis current instruction value id_ref and the current value id, and outputs the deviation to the current controller 504.

The current controller 503 generates a driving voltage Vq based on proportional control (P), integral control (I), and differential control (D) such that the input deviation decreases. Specifically, the current controller 503 generates and outputs the driving voltage Vq in the rotating coordinate system such that the input deviation becomes 0. The current controller 504 generates and outputs a driving voltage Vd in the same manner as the current controller 503. Although the current controllers 503 and 504 in the present embodiment generate the driving voltages Vq and Vd based on PID control, the current controllers 503 and 504 may generate the driving voltages Vq and Vd based on PI control. Note that the current controllers 503 and 504 in the present embodiment correspond to the PID control unit 202 in the first and second embodiments.

The coordinate converter 505 performs reverse coordinate conversion to convert the driving voltages Vq and Vd in the rotating coordinate system, output from the current controllers 503 and 504, to the driving voltages Vα and Vβ in the stationary coordinate system, by using the following equations.

$$V\alpha = \cos \theta^* Vd - \sin \theta^* Vq \quad (25)$$

$$V\beta = \sin \theta^* Vd + \cos \theta^* Vq \quad (26)$$

After performing reverse coordinate conversion to convert the driving voltages Vq and Vd in the rotating coordinate system to the driving voltages Vα and vβ in the stationary coordinate system, the coordinate converter 505 outputs Vα and Vβ to the induced voltage determination unit 512 and the PWM inverter 506.

In this way, the vector control unit 515 performs vector control to control the driving currents that are to be supplied to the windings of the stepping motor 509 corresponding to the respective phases, by using the current values in the rotating coordinate system (the d- and q-axes) defined with the rotational phase θ of the rotor of the stepping motor 509 as a reference.

The PWM inverter 506 includes the motor driving circuit 250 shown in FIG. 1. The motor driving circuit 250 is driven by the PWM signals that are based on the driving voltages Vα and Vβ input from the coordinate converter 505. As a result, the driving currents iα and iβ corresponding to the driving voltages Vα and Vβ are supplied to the windings of the motor 509 corresponding to the respective phases. As a result, it is possible to drive the stepping motor 509.

<Sensorless Control>

As described above, in vector control, it is necessary to determine the rotational phase and the rotational speed of the rotor of the motor in order to perform phase control and speed control on the rotor of the motor.

Usually, in order to detect (estimate) the rotational phase and the rotational speed of the rotor of a motor, a rotary encoder is attached to the rotational shaft of the motor. The rotational phase is detected based on the number of output pulses from the encoder, and the rotational speed is detected based on the period of the output pulses from the encoder. However, the addition of an encoder is problematic in that the cost increases and space for arranging the encoder is required. Therefore, there is a proposal for sensorless control by which the rotational phase and the rotational speed of the rotor of the motor are determined (estimated) without using the encoder or the like, and vector control is performed based on the result of determination. The following describes sensorless control for the stepping motor 509 with reference to FIG. 12 again.

The induced voltage determination unit 512 determines the induced voltages (the A-phase counter voltage and the B-phase counter voltage) that are induced across the A-phase (first phase) winding and the B-phase (second phase) winding due to the rotation of the rotor of the stepping motor 509. Specifically, the induced voltage determination unit 512 determines an induced voltage Eα across the A-phase (first phase) winding and an induced voltage Eβ across the B-phase (second phase) winding, based on the current values is and iβ output from the current detection units 507 and 508 and the driving voltages Vα and Vβ output from the vector control unit 515, by using the following voltage equations.

$$E\alpha = V\alpha - R^* i\alpha - L^* di\alpha/dt \quad (27)$$

$$E\beta = V\beta - R^* i\beta - L^* di\beta/dt \quad (28)$$

Here, R denotes a winding resistance, and L denotes a winding inductance. The values of R and L are unique to the stepping motor 509 that is used, and are stored in advance in a memory (not shown) that is provided in the motor control unit 200, for example.

The induced voltages Eα and Eβ determined by the induced voltage determination unit 512 are input to the phase determination unit 513. The phase determination unit 513 determines the rotational phase θ of the rotor of the stepping motor 509 based on the A-phase induced voltage Eα and the B-phase induced voltage Eβ, by using the following equation.

$$\theta = \tan^{-1}(-E\beta/E\alpha) \quad (29)$$

Although the phase determination unit 513 in the present embodiment determines the rotational phase θ by performing a calculation based on the equation (29), the present invention is not limited in this way. For example, a table that shows a relationship between the induced voltage Eα and the induced voltage Eβ and the rotational phase θ corresponding to the induced voltage Eα and the induced voltage Eβ may be stored in a memory (not shown), and the phase determination unit 513 may determine the rotational phase θ with reference to the table. The rotational phase θ obtained in the above-described manner is input to the subtractor 101, the speed determination unit 514, and the coordinate converters 505 and 511.

Thereafter, the motor control unit 200 repeatedly performs this control.

Figure 14:
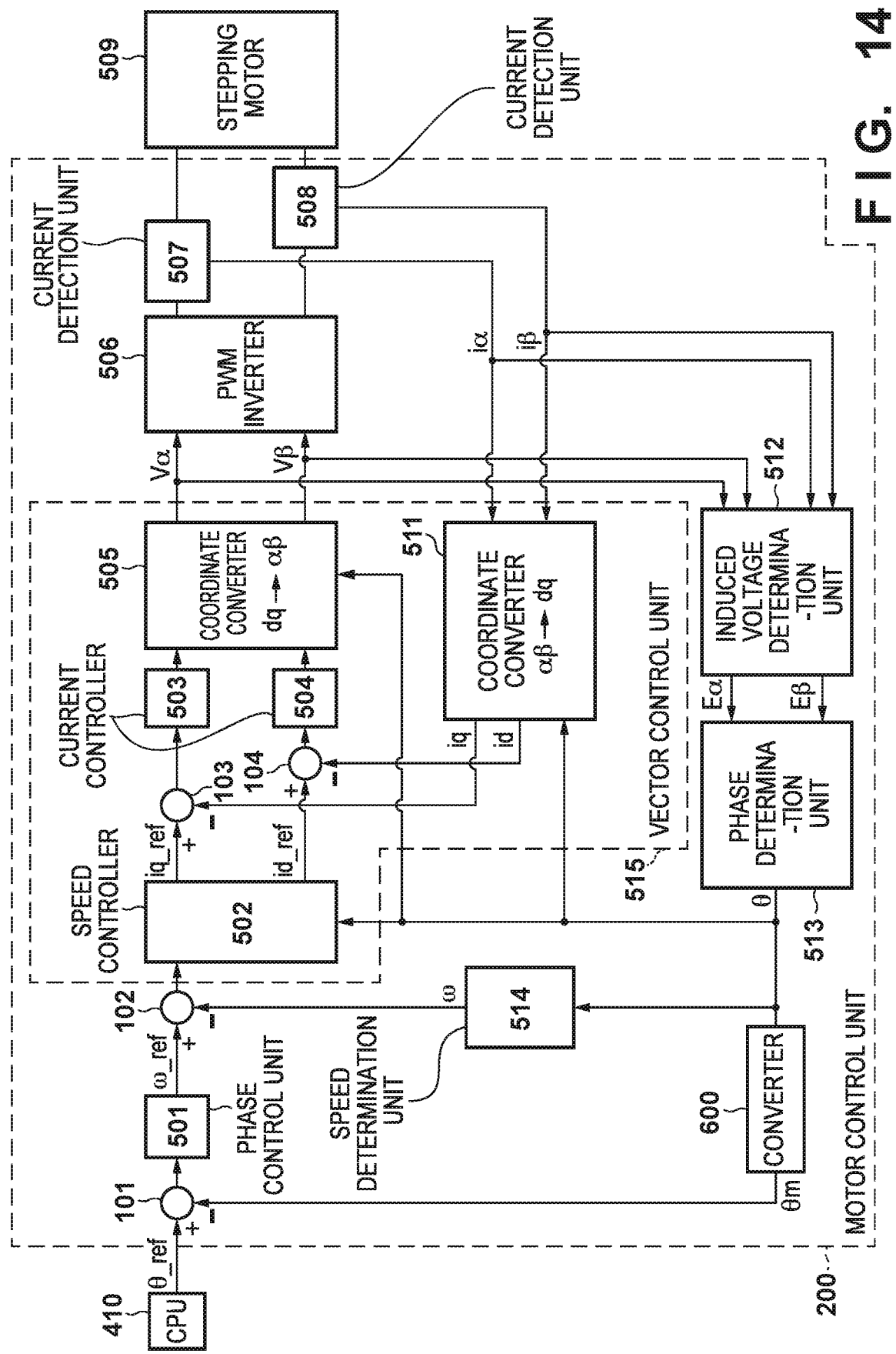
FIG. 14 is a block diagram showing a case where a converter 600 is provided in the motor control unit 200.

Note that if an actual rotational phase θm (a mechanical angle) of the rotor of the stepping motor 509 and the rotational phase θ thus determined (an electrical angle) are not in one-to-one correspondence, a convertor 600 that converts an electrical angle θ to a mechanical angle θm may be provided between the phase determination unit 513 and the phase control unit 501 as shown in FIG. 14.

The speed determination unit 514 determines the rotational speed ω of the rotor of the stepping motor 509 based on the input rotational phase θ, by using the following equation.

$$\omega = d\theta/dt \quad (30)$$

As shown in the equation (30), the rotational speed ω is determined based on a temporal change in the rotational phase θ. The speed determination unit 514 outputs the rotational speed ω thus determined to the speed controller 502.

<PWM Inverter 506 and Current Detection Units 507 and 508>

Figure 15:
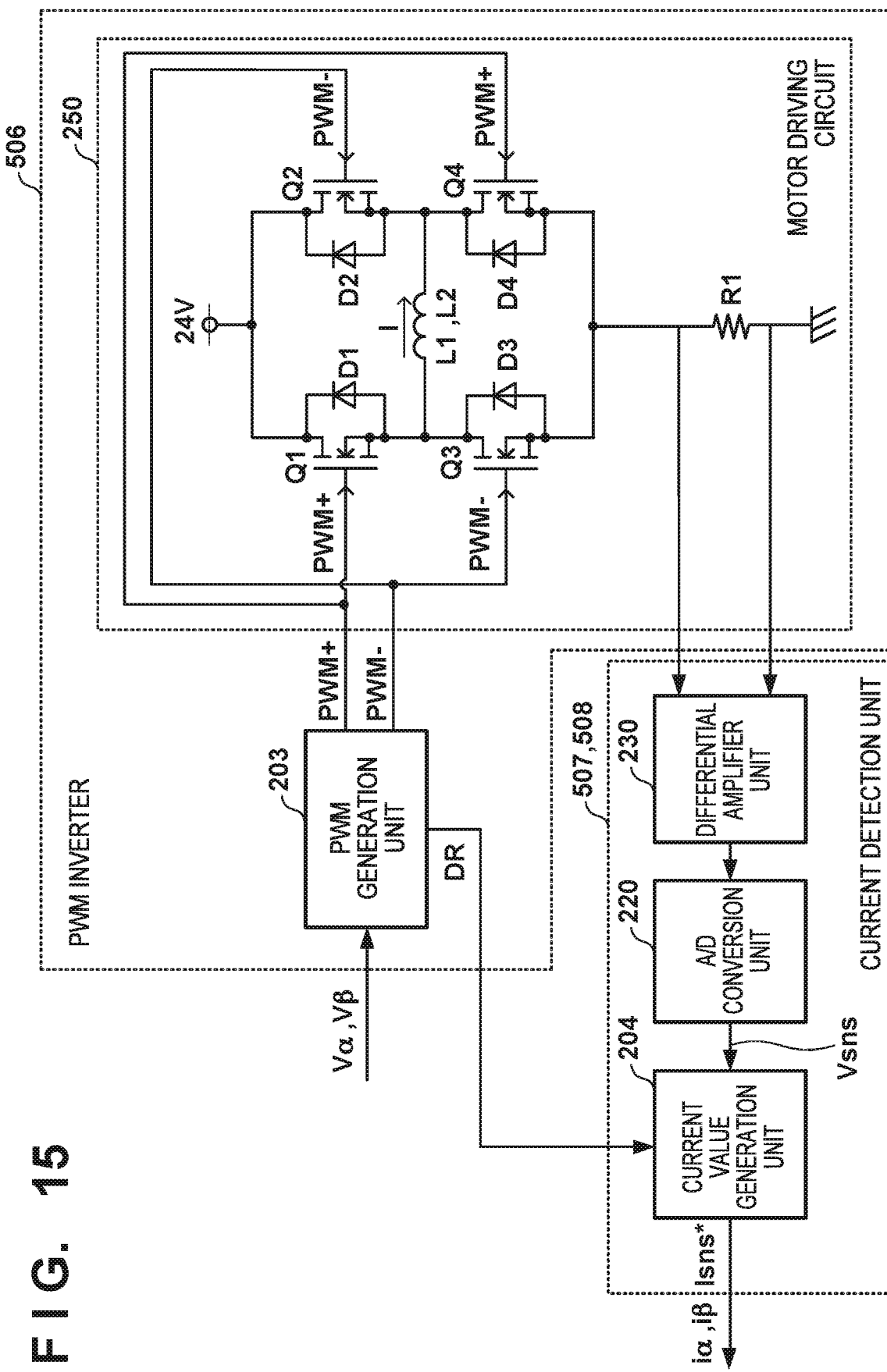
FIG. 15 is a diagram showing examples of configurations of a PWM inverter 506 and current detection units 507 and 508.

FIG. 15 is a diagram showing examples of the configurations of the PWM inverter 506 and the current detection unit 507 shown in FIG. 12. In the present embodiment, the PWM generation unit 203 is provided in the PWM inverter 506, and the current value generation unit 204, the A/D conversion unit 220, and the differential amplifier unit 230 are provided in each of the current detection units 507 and 508. Note that the windings shown in FIG. 15 are, in reality, windings provided in the stepping motor 509. In other words, the windings are provided outside the motor control unit 200. Also note that the current detection unit 507 and the current detection unit 508 have the same configuration.

The PWM inverter 506 includes the PWM generation unit 203 and the motor driving circuit 250 that correspond to the A-phase of the stepping motor 509 and the PWM generation unit 203 and the motor driving circuit 250 that correspond to the B-phase of the stepping motor 509. Note that although FIG. 15 only shows the PWM generation unit 203 and the motor driving circuit 250 that correspond to the A-phase of the stepping motor 509, in reality the PWM inverter 506 also includes the PWM generation unit 203 and the motor driving circuit 250 that correspond to the B-phase. The H bridge circuit in the motor driving circuit 250 that corresponds to the A-phase is connected to the coil L1 that is the A-phase winding of the stepping motor. The H bridge circuit in the motor driving circuit 250 that corresponds to the B-phase is connected to the coil L2 that is the B-phase winding of the stepping motor.

In the following description, the PWM generation unit 203, the motor driving circuit 250, and the current detection unit 507 that correspond to the A-phase are mainly described. However, the PWM generation unit 203, the motor driving circuit 250, and the current detection unit 508 that correspond to the B-phase have configurations that are respectively the same as those that correspond to the A-phase. The driving voltage Vα output from the vector control unit 515 is input to the PWM generation unit 203 corresponding to the A-phase. Note that the driving voltage Vβ output from the vector control unit 515 is input to the PWM generation unit 203 corresponding to the B-phase. The PWM generation unit 203 generates PWM signals having a duty ratio that corresponds to the driving voltages Vα and Vβ, and outputs the PWM signals thus generated to the motor driving circuit 250. Specifically, the PWM generation unit 203 generates, for each PWM signal cycle, a PWM signal (PWM+) with the duty ratio corresponding to the driving voltages Vα and Vβ, and a PWM signal (PWM−) that is in an antiphase relationship with the PWM signal (PWM+). As described above, PWM+ is used to drive the FETs Q1 and Q4, and PWM− is used to drive the FETs Q2 and Q3.

The current detection unit 507 detects the driving current that passes through the coil L1 by using the current detection resistor R1 provided in the motor driving circuit 250 corresponding to the A-phase, and outputs the detection value iα of the driving current. The current detection unit 508 detects the driving current that passes through the coil L2 by using the current detection resistor R1 provided in the motor driving circuit 250 corresponding to the B-phase, and outputs the detection value iβ of the driving current. Specifically, the differential amplifier unit 230, the A/D conversion unit 220, and the current value generation unit 204 in each of the current detection units 507 and 508 operate in the manner described in the first and second embodiments.

As a result, the current detection units 507 and 508 output the detection values Isns* generated by the respective current value generation units 204 as the current detection values iα and iβ.

In the present embodiment, the processing described in the first and second embodiments is applied to the motor control unit 200, and thus it is possible to realize vector control for the stepping motor 509 that is to be driven. Therefore, with the motor control unit 200 according to the present embodiment, it is possible to achieve the same effects as those of the first and second embodiments, while realizing vector control for the stepping motor 509.

Note that although the current value generation unit 204 in the first to third embodiments detects the current at the midpoint of the H period or the midpoint of the L period, the time point at which the current is detected is not limited to the midpoint of the period. For example, the current value generation unit 204 may detect the current at a time point that is displaced from the midpoint of the period.

Also, although a stepping motor is used in the first to third embodiments, another type of motor such as a DC motor may be used. Also, the motor is not limited to a two-phase motor, and the first to third embodiments can be applied to another type of motor such as a three-phase motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069275, filed Mar. 30, 2016, which is hereby incorporated by reference herein in its entirety.

What is claimed is:

1. A motor driving apparatus comprising:
    a driving circuit that includes a plurality of switching elements constituting an H bridge circuit, and to which a winding of a motor is connected;
    a detector configured to detect a driving current that flows through the winding of the motor;

a corrector configured to sample a current value of the driving current detected by the detector, and correct a sampled current value;

a controller configured to control the motor based on the current value corrected by the corrector, the controller including:

a phase determiner configured to determine a rotational phase of a rotor of the motor based on the current value corrected by the corrector, and a voltage generator configured to generate a driving voltage that drives the driving circuit such that a deviation between a torque current component of the sampled current value corrected by the corrector and a target value of the torque current component decreases, wherein the target value of the torque current component is set such that a deviation between an instruction phase that indicates a target phase of the rotor of the motor and the rotational phase determined by the phase determiner decreases, and wherein the torque current component is a current component generating torque on the rotor of the motor and represented in a rotating coordinate system based on the rotational phase determined by the phase determiner; and a pulse generator configured to generate a PWM signal based on the driving voltage generated by the voltage generator, wherein the PWM signal controls ON and OFF operations of the plurality of switching elements and includes a pulse at a first level and a pulse at a second level that is different from the first level, wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, and wherein the corrector corrects the current value sampled in the first period based on a first correction value that reduces the current value, and corrects the current value sampled in the second period based on a second correction value that increases the current value, the second correction value being different from the first correction value.

2. The motor driving apparatus according to claim 1, wherein the first correction value and the second correction value are set, in advance, based on a current value of the driving current when the duty ratio is equal to the predetermined value.

3. The motor driving apparatus according to claim 1, wherein the second correction value is a value which is set by an absolute value of a difference between a first current value and a second current value being divided by 2, the first current value being a current value of the driving current flowing through the winding in the first period when the duty ratio is equal to the predetermined value and the second current value being a current value of the driving current flowing through the winding in the second period when the duty ratio is equal to the predetermined value, and wherein the first correction value is a value which is obtained by a polarity of the second correction value being reversed.

4. The motor driving apparatus according to claim 1, wherein the corrector adjusts the first correction value and the second correction value according to the duty ratio of the PWM signal generated by the pulse generator, and corrects the current value based on the adjusted first correction value and the adjusted second correction value.

5. The motor driving apparatus according to claim 1, wherein the corrector adjusts the first correction value and the second correction value according to a current value of the driving current at a time point when the PWM signal generated by the pulse generator switches between the first level and the second level, and corrects the current value based on the adjusted first correction value and the adjusted second correction value.

6. The motor driving apparatus according to claim 1, wherein the corrector adjusts the first correction value and the second correction value according to an induced voltage that is induced across the winding due to rotation of a rotor of the motor, and corrects the current value based on the adjusted first correction value and the adjusted second correction value.

7. The motor driving apparatus according to claim 1, wherein, in a case of sampling the current value of the driving current in the first period, the corrector performs sampling at a midpoint of the first period, and in a case of sampling the current value of the driving current in the second period, the corrector performs sampling at a midpoint of the second period.

8. The motor driving apparatus according to claim 1, wherein the corrector does not reverse the polarity of the current value of the driving current thus sampled if the duty ratio is greater than or equal to the predetermined value, and reverses the polarity of the current value of the driving current thus sampled if the duty ratio is smaller than the predetermined value.

9. The motor driving apparatus according to claim 1, wherein the predetermined value is 50%.

10. The motor driving apparatus according to claim 1, wherein, in the driving circuit, one end of a first switching element and one end of a second switching element are connected to a power supply, one end of a third switching element is connected to the other end of the first switching element in series, one end of a fourth switching element is connected to the other end of the second switching element in series, a resistor is connected to the other end of the third switching element and the other end of the fourth switching element, the resistor is grounded, and one end of the winding of the motor is connected to a conducting wire that connects the first switching element and the third switching element to each other, and the other end of the winding of the motor is connected to a conducting wire that connects the second switching element and the fourth switching element to each other.

11. The motor driving apparatus according to claim 10, wherein the pulse generator generates a first PWM signal that controls ON and OFF operations of the first switching element and the fourth switching element, and generates a second PWM signal that controls ON and OFF operations of the second switching element and the third switching element and that is in an antiphase relationship with the first PWM signal, wherein the first period is a period in which the first PWM signal is at the first level, and the second period is a period in which the first PWM signal is at the second level.

12. The motor driving apparatus according to claim 1, wherein the controller includes an induced voltage determiner configured to determine an induced voltage across a winding that corresponds to a first phase of the motor, and an induced voltage across a winding that corresponds to a second phase of the motor, due to rotation of a rotor of the motor, based on the current value corrected by the corrector, and
wherein the phase determiner determines the rotational phase of the rotor of the motor based on the induced voltage that corresponds to the first phase and the induced voltage that corresponds to the second phase determined by the induced voltage determiner.

13. A sheet conveyance apparatus comprising:
a conveyance roller configured to convey a sheet;
a motor configured to drive the conveyance roller; and
a motor driving apparatus that includes
  a driving circuit that includes a plurality of switching elements constituting an H bridge circuit, and to which a winding of the motor is connected,
  a detector configured to detect a driving current that flows through the winding of the motor,
  a corrector configured to sample a current value of the driving current detected by the detector, and correct a sampled current value;
  a controller configured to control the motor based on the current value corrected by the corrector, the controller including:
    a phase determiner configured to determine a rotational phase of a rotor of the motor based on the current value corrected by the corrector, and
    a voltage generator configured to generate a driving voltage that drives the driving circuit such that a deviation between a torque current component of the sampled current value corrected by the corrector and a target value of the torque current component decreases, wherein the target value of the torque current component is set such that a deviation between an instruction phase that indicates a target phase of the rotor of the motor and the rotational phase determined by the phase determiner decreases, and wherein the torque current component is a current component generating torque on the rotor of the motor and represented in a rotating coordinate system based on the rotational phase determined by the phase determiner, and
  a pulse generator configured to generate a PWM signal based on the driving voltage generated by the voltage generator, wherein the PWM signal controls ON and OFF operations of the plurality of switching elements and includes a pulse at a first level and a pulse at a second level that is different from the first level,
wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level,
wherein the corrector corrects the current value sampled in the first period, based on a first correction value that reduces the current value, and corrects the current value sampled in the second period, based on a second correction value that increases the current value, the second correction value being different from the first correction value, and
wherein the motor driving apparatus controls driving of the motor.

14. A motor driving apparatus comprising:
a driving circuit that includes a plurality of switching elements constituting an H bridge circuit, and to which a winding of a motor is connected;
a detector configured to detect a driving current that flows through the winding of the motor;
a corrector configured to sample a current value of the driving current detected by the detector, and correct a sampled current value;
a controller configured to control the motor based on the current value corrected by the corrector, the controller including:
  a phase determiner configured to determine a rotational phase of a rotor of the motor based on the current value corrected by the corrector,
  a speed determiner configured to determine a rotational speed of the rotor of the motor, and
  a voltage generator configured to generate a driving voltage that drives the driving circuit such that a deviation between a torque current component of the sampled current value corrected by the corrector and a target value of the torque current component decreases, wherein the target value of the torque current component is set such that a deviation between an instruction speed that indicates a target speed of the rotor of the motor and the rotational speed determined by the speed determiner decreases, and wherein the torque current component is a current component generating torque on the rotor of the motor and represented in a rotating coordinate system based on the rotational phase determined by the phase determiner; and
a pulse generator configured to generate a PWM signal based on the driving voltage generated by the voltage generator, wherein the PWM signal controls ON and OFF operations of the plurality of switching elements and includes a pulse at a first level and a pulse at a second level that is different from the first level;
wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level, and
wherein the corrector corrects the current value sampled in the first period based on a first correction value that reduces the current value, and corrects the current value sampled in the second period based on a second correction value that increases the current value, the second correction value being different from the first correction value.

15. A sheet conveyance apparatus comprising:
a conveyance roller configured to convey a sheet;
a motor configured to drive the conveyance roller; and a motor driving apparatus that includes
- a driving circuit that includes a plurality of switching elements constituting an H bridge circuit, and to which a winding of the motor is connected,
- a detector configured to detect a driving current that flows through the winding of the motor,
- a corrector configured to sample a current value of the driving current detected by the detector, and correct a sampled current value;
- a controller configured to control the motor based on the current value corrected by the corrector, the controller including:
  - a phase determiner configured to determine a rotational phase of a rotor of the motor based on the current value corrected by the corrector,
  - a speed determiner configured to determine a rotational speed of the rotor of the motor, and
  - a voltage generator configured to generate a driving voltage that drives the driving circuit such that a deviation between a torque current component of the sampled current value corrected by the corrector and a target value of the torque current component decreases, wherein the target value of the torque current component is set such that a deviation between an instruction speed that indicates a target speed of the rotor of the motor and the rotational speed determined by the speed determiner decreases, and wherein the torque current component is a current component generating torque on the rotor of the motor and represented in a rotating coordinate system based on the rotational phase determined by the phase determiner; and
  - a pulse generator configured to generate a PWM signal based on the driving voltage generated by the voltage generator, wherein the PWM signal controls ON and OFF operations of the plurality of switching elements and includes a pulse at a first level and a pulse at a second level that is different from the first level,
- wherein, if a duty ratio that indicates a proportion of a first period in which the PWM signal is at the first level, to a period of the PWM signal, is greater than a predetermined value, the corrector samples a current value of the driving current detected by the detector, in the first period, and if the duty ratio is smaller than the predetermined value, the corrector samples a current value of the driving current detected by the detector, in a second period in which the PWM signal is at the second level,
- wherein the corrector corrects the current value sampled in the first period, based on a first correction value that reduces the current value, and corrects the current value sampled in the second period, based on a second correction value that increases the current value, the second correction value being different from the first correction value, and
- wherein the motor driving apparatus controls driving of the motor.

* * * * *